US010796328B2

(12) United States Patent
Roux et al.

(10) Patent No.: US 10,796,328 B2
(45) Date of Patent: Oct. 6, 2020

(54) METHOD AND SYSTEM FOR SOLICITING AND REWARDING CURATED AUDIENCE FEEDBACK

(71) Applicant: Target Brands, Inc., Minneapolis, MN (US)

(72) Inventors: Thibault A. Roux, St. Louis Park, MN (US); Kevin Behrens, St. Louis Park, MN (US); Joel Bodkin, St. Louis Park, MN (US); Stacy Adelmann, St. Louis Park, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 157 days.

(21) Appl. No.: 16/044,128

(22) Filed: Jul. 24, 2018

(65) Prior Publication Data
US 2019/0034950 A1 Jan. 31, 2019

Related U.S. Application Data

(60) Provisional application No. 62/536,671, filed on Jul. 25, 2017.

(51) Int. Cl.
*G06Q 30/02* (2012.01)
*G06Q 50/00* (2012.01)
*G06Q 30/06* (2012.01)

(52) U.S. Cl.
CPC ..... *G06Q 30/0217* (2013.01); *G06Q 30/0209* (2013.01); *G06Q 30/0282* (2013.01); *G06Q 50/01* (2013.01); *G06Q 30/0643* (2013.01)

(58) Field of Classification Search
CPC .............................. G06Q 30/02; G06Q 50/01
See application file for complete search history.

(56) References Cited

U.S. PATENT DOCUMENTS

| 6,574,614 | B1 | 6/2003 | Kesel |
| 6,631,184 | B1 | 10/2003 | Weiner |
| 7,072,847 | B2 | 7/2006 | Ulenas et al. |
| 7,085,820 | B1 | 8/2006 | Nickerson et al. |
| 7,181,696 | B2 | 2/2007 | Brock |
| 7,370,276 | B2 | 5/2008 | Willis |
| 7,657,458 | B2 | 2/2010 | Calabria |
| 8,224,353 | B2 | 7/2012 | Wright et al. |

(Continued)

OTHER PUBLICATIONS

Haslehurst et al, The Potential of Geolocation for Revolutionizing Retail, https://hbr.org/2015/11/the-potential-of-geolocation-for-revolutionizing-retail; dated Nov. 13, 2015, pp. 1-8.

(Continued)

*Primary Examiner* — Vincent M Cao
(74) *Attorney, Agent, or Firm* — Merchant & Gould P.C.

(57) ABSTRACT

Methods and systems for soliciting feedback are described. One method includes providing a social media-based platform that includes a social media feed for two-way communication between designers and a curated audience, such as product consumers. Designers can post to the feed soliciting feedback from a selected audience. Audience members respond to the posts on the social media feed. Designers can provide positive evaluations of the feedback and reward individual audience members for valuable feedback, and can select specific feedback for further use and/or publication.

20 Claims, 28 Drawing Sheets

(56) References Cited

U.S. PATENT DOCUMENTS

| | | |
|---|---|---|
| 8,229,458 B2 | 7/2012 | Busch |
| 8,332,232 B2 | 12/2012 | Nickerson et al. |
| 8,370,269 B2 | 2/2013 | MacDonald-Korth et al. |
| 8,489,112 B2 | 7/2013 | Roeding et al. |
| 8,504,410 B2 | 8/2013 | Pasta |
| 8,504,423 B2 | 8/2013 | Rotbard et al. |
| 8,527,344 B2 | 9/2013 | Rosenthal |
| 8,719,178 B2 | 5/2014 | Zhang et al. |
| 8,793,718 B2 | 7/2014 | White |
| 8,838,589 B1 | 9/2014 | Tam |
| 8,909,542 B2 | 12/2014 | Montero et al. |
| 8,909,771 B2 | 12/2014 | Heath |
| 8,918,391 B2 | 12/2014 | Polonsky et al. |
| 8,924,303 B2 | 12/2014 | Chang et al. |
| 8,965,409 B2 | 2/2015 | Abhyanker |
| 9,489,680 B2 | 11/2016 | Baker et al. |
| 9,589,279 B2 | 3/2017 | Biswas et al. |
| 2005/0273378 A1 | 12/2005 | MacDonald-Korth et al. |
| 2007/0192183 A1 | 8/2007 | Monaco et al. |
| 2008/0077461 A1 | 3/2008 | Glick |
| 2008/0162399 A1 | 7/2008 | Tam et al. |
| 2008/0172274 A1 | 7/2008 | Hurowitz et al. |
| 2008/0262925 A1 | 10/2008 | Kim et al. |
| 2009/0070200 A1 | 3/2009 | August |
| 2009/0070228 A1* | 3/2009 | Ronen ............... G06Q 30/0601 705/26.1 |
| 2009/0125394 A1 | 5/2009 | Otto et al. |
| 2009/0271289 A1 | 10/2009 | Klinger et al. |
| 2009/0319342 A1 | 12/2009 | Shilman et al. |
| 2010/0223119 A1 | 9/2010 | Klish |
| 2011/0028160 A1 | 2/2011 | Roeding et al. |
| 2011/0178863 A1 | 7/2011 | Daigle |
| 2011/0184792 A1 | 7/2011 | Butcher et al. |
| 2011/0191417 A1 | 8/2011 | Rathod |
| 2011/0258560 A1 | 10/2011 | Mercuri et al. |
| 2011/0320250 A1* | 12/2011 | Gemmell ............... G06Q 30/02 705/14.16 |
| 2012/0036079 A1 | 2/2012 | Jacob Sushil et al. |
| 2012/0253918 A1 | 10/2012 | Marois et al. |
| 2012/0260201 A1 | 10/2012 | Ganesh et al. |
| 2012/0284090 A1 | 11/2012 | Marins et al. |
| 2012/0310750 A1* | 12/2012 | Schutzbank ........... G06Q 30/02 705/14.72 |
| 2013/0006733 A1* | 1/2013 | Fisher ................... G06Q 30/02 705/14.12 |
| 2013/0054334 A1 | 2/2013 | Ross et al. |
| 2013/0073388 A1 | 3/2013 | Heath |
| 2013/0124298 A1 | 5/2013 | Li et al. |
| 2013/0232426 A1* | 9/2013 | Rego .................. G06Q 10/101 715/751 |
| 2013/0238971 A1 | 9/2013 | Zheng et al. |
| 2013/0339091 A1 | 12/2013 | Humay |
| 2013/0346170 A1 | 12/2013 | Epstein et al. |
| 2014/0220883 A1 | 8/2014 | Emigh et al. |
| 2014/0278942 A1* | 9/2014 | Buffamanti ............ G06Q 50/01 705/14.45 |
| 2015/0149315 A1* | 5/2015 | Tischer .............. G06Q 30/0601 705/26.1 |
| 2016/0134633 A1* | 5/2016 | Gaddam ................ G06Q 50/01 726/4 |
| 2016/0180365 A1* | 6/2016 | Shi .................... G06Q 30/0217 705/14.19 |
| 2016/0253709 A1* | 9/2016 | Chen ................. G06Q 30/0269 705/14.58 |
| 2016/0335692 A1 | 11/2016 | Yamartino et al. |
| 2016/0335722 A1* | 11/2016 | Bous ...................... G06Q 40/06 |
| 2017/0213259 A1* | 7/2017 | Gruber .................. G06Q 20/32 |
| 2018/0218387 A1* | 8/2018 | Delly ................ G06Q 30/0217 |

OTHER PUBLICATIONS

Satisfi Labs, Turning Questions into Revenue, http://biz.satis.fi/; Printed Oct. 25, 2018, pp. 1-6.

Accenture.com; Beacons transform how retail does business, https://www.accenture.com/us-en/insight-beacons-location-based-technology-revolutionizing-how-retailers-business; Printed Oct. 25, 2018, pp. 1-3.

* cited by examiner

METHOD AND SYSTEM FOR SOLICITING AND REWARDING CURATED AUDIENCE FEEDBACK

CROSS-REFERENCE TO RELATED APPLICATIONS

The present application claims priority from U.S. Provisional Patent Application No. 62/536,671, filed on Jul. 25, 2017, the disclosure of which is hereby incorporated by reference in its entirety.

TECHNICAL FIELD

The present disclosure relates generally to soliciting feedback from a curated audience, such as a selected group of possible consumers, regarding product design.

BACKGROUND

Product designers rely on consumer feedback to inform decisions about future product offerings. Product designers can solicit feedback from consumers to inform design decisions while developing a product. In some instances, feedback will be solicited from consumers after a product is already being sold in the market in order to determine if changes to the product design should be made in the future. Traditionally, consumer feedback has come either from product testing managed by outside firms or by waiting until products are being sold and consumers have reviewed the products of their own accord.

Such existing arrangements have limitations. For example, products must be released to the general public for designers to have the ability to obtain feedback. Furthermore, the rate of feedback and quality of feedback is generally low when feedback is solicited from a large group of consumers. Although some efforts have been made to build platforms for product feedback from smaller groups of individuals or consumers, those platforms continue to have difficulty in retaining consumers' interest in providing feedback, and are typically tied to a single entity's product designers for feedback. Additionally, feedback provided by individuals or consumers is generally routed only to those product designers; even if the feedback is positive, other individuals or consumers may not obtain the benefit of that feedback.

SUMMARY

In summary, the present disclosure relates to methods and systems for soliciting and rewarding feedback from a curated audience. A social media-based platform provides a means for communication between designers and such audience members. Feedback is used by designers to improve product design. Designers can reward audience members for valuable feedback.

In a first example aspect, a method of soliciting feedback from a curated audience is disclosed. The method includes providing a social media-based platform for soliciting feedback in exchange for rewards, the social media-based platform comprising a social media feed for two-way communication, and receiving a post from a designer, the post soliciting feedback from one or more consumers regarding one or more products. The method further includes displaying the post from the designer on the social media feed and receiving and displaying feedback from audience members regarding the one or more products in response to the post on the social media feed. The method also includes, upon receiving a positive evaluation of an audience member's feedback from the designer, rewarding the audience member for the positive evaluation.

In a second example aspect, a social media-based product feedback platform is disclosed. The platform includes a product feedback server comprising a processor, a memory communicatively coupled to the processor, and a network access device, the memory storing instructions executable by the processor to: receive posts from one or more designer computing devices; present the posts on a social media feed accessible by one or more consumer computing devices; receive feedback from the one or more consumer computing devices; present the feedback to the posts on the social media feed accessible by the one or more designer computing devices; receive evaluations of the feedback from the designer computing devices; and present the evaluations on the social media feed.

In a third example aspect, a social media-based product feedback platform is disclosed. The platform includes a product feedback server comprising: a social media interface engine for presenting posts and feedback on a social media feed, a consumer reward engine for communicating rewards to consumer users and accounting for rewards, a public website integration engine for communicating feedback content from the social media feed to a publicly accessible website, and a gaming engine for generating games and posting the games on the social media feed. The platform also includes an administrative server comprising: a posting management engine for managing timing and content of posts to the social media feed a licensing engine for managing licenses to third parties, a permissions engine for managing permissions granted from users regarding content on the social media feed, and a public web server for integrating the social media feed content with a public website.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
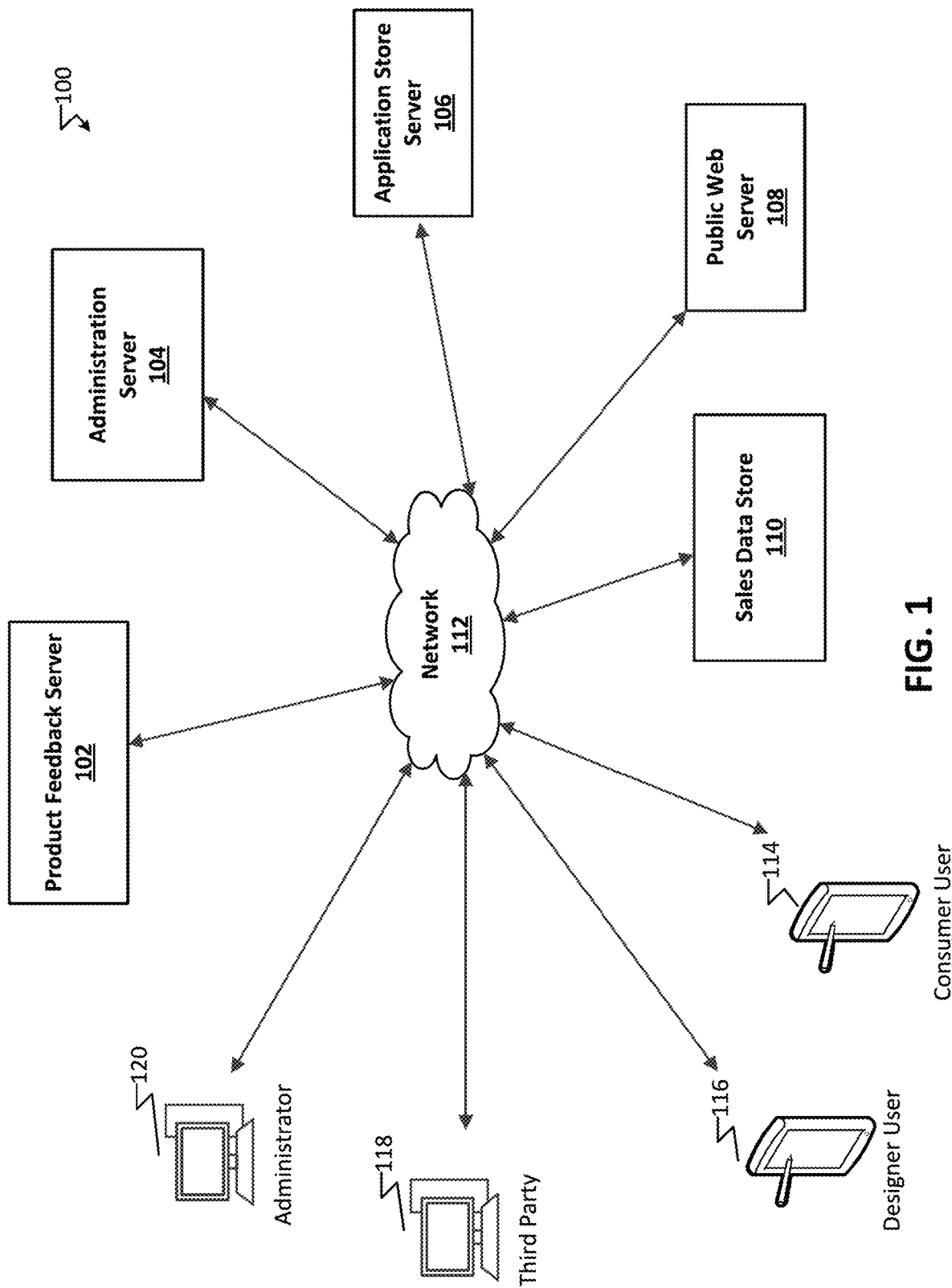
FIG. 1 illustrates a diagram of an example network and system in which feedback can be solicited.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for soliciting feedback from audience members, such as product consumers. In particular, the present disclosure relates to soliciting feedback regarding product design. Product designers need a way to obtain feedback from consumers, or potential consumers, regarding product designs both while the product is being developed and after the product is being sold. This feedback is valuable for making product design decisions and influencing future product offerings.

Audience members can be, in some embodiments curated by an administrator or by designers, such that the designers can address requests to those individuals most likely to provide valuable feedback. Such audience members may receive requests in the form of posts in the social media feed. In such aspects of the present disclosure, feedback is provided through a social media-based platform. The social media-based platform operates to generate a social media feed that is accessible through a network. Product designers can post on the social-media feed. Posts can feature pictures, videos, and/or text and typically will request a particular type of feedback from audience members. Posts may be displayed as scrollable listings of combinations of text and images or videos. Typically the text will provide a request for feedback from the audience member users. The requests may have varying levels of specificity ranging from "What do you think?" to "Which sleeve cuff style do you like more and why?"

Audience members can access the social-media feed to view the posts. In some embodiments, the posts that the consumers see on the feed are filtered based on the consumer's preferences and interests. Audience members can also browse feeds by category. Audience members can also provide feedback to the posts. The feedback can come in the form of comments, likes, responding to polls, etc. In some instances, the audience member may post photos or videos in response to the posts.

In some embodiments, product designers can respond to the audience member feedback by commenting, liking, or sharing the feedback. In some instances, the audience member is rewarded when the product designers provide favorable evaluations of their feedback by liking or sharing the audience member feedback. The rewards may be points, monetary awards, coupons, or even invitations to exclusive events or promotions.

In addition to rewards, audience members gain benefits from involvement in the social media-based platform in the form of early access. Many audience members like to know what products are new and upcoming. In exchange for their valuable feedback, audience members also get an early look at new trends. Designers benefit greatly from the feedback received from these audience members because they are interested in the products and are willing to provide detailed responses to the designers' questions.

In addition to the benefits to the designers and audience members, a number of efficiencies exist with respect to the system as described herein, relative to existing feedback mechanisms. For example, and as further discussed below, the systems described herein integrate closed-audience feedback systems with open or public websites to allow for publication of otherwise-private feedback as triggered by a designer, rather than by the consumer himself. Accordingly, the final decision regarding whether to publish previously-private feedback is given to the designer rather than to the consumer, which improves control regarding ensuring correct feedback being published with respect to the product as actually made available to the public. Furthermore, such selections to publish content automatically trigger additional events, such as crediting points or sending a message to a consumer to encourage such valuable feedback. Still further, controls are incorporated to allow designers associated with one entity access to customers of another entity (e.g., a pre-curated list of another entity's customers), while allowing the entity whose customers are being contacted control over the type, frequency, and manner of contact.

In one embodiment, a method of soliciting feedback from a curated audience includes providing a social media-based platform for soliciting feedback in exchange for rewards, the social media-based platform comprising a social media feed for two-way communication. A post is received from a designer, the post soliciting feedback from one or more consumers regarding one or more products. The post from the designer is displayed on the social media feed. Feedback from audience members is received and displayed, the feedback regarding the one or more products in response to the post on the social media feed. Upon receiving a positive evaluation of an audience member's feedback from the designer, the audience member is rewarded for the positive evaluation.

In some aspects, the social media-based platform is available and accessible to a curated group of audience members. The audience members can include consumers invited to the closed group through a social media interaction with a first retailer. In some embodiments, the designers can include designers for a second retailer.

The posts made to the social media feed can include one or more of images, videos, audio, and text. In some instances, the post is a request for a consumer to purchase the product and provide feedback on the product. In some embodiments, the feedback is a review of the product. The review can include one or more images and videos of the product. In some embodiments, the post is an image or video of a product combined with text asking a question about the product. In some aspects, the feedback comprises one or more of text comments, likes, votes, images, videos, GIFs, and ratings.

In some embodiments, the method further comprises regulating the frequency at which posts are published to the social media feed.

In some embodiments, positive evaluations are one or more of likes, shares, pins, stars, and ratings. Rewarding the audience member can include awarding the audience member one or more of points, tokens, badges, and coins that can be exchanged for one or more of gift cards, coupons, promotional codes, invitations to exclusive events, free products, and access to exclusive content. In some embodiments, rewards associated with the audience member are recorded in an account associated with the audience member.

In some embodiments, reviews received as feedback from audience members are posted to a public website. The method may include requesting permission from the audience member to post the feedback on a public website.

Posts to the social media feed can include games designed to increase audience member interaction by providing rewards in exchange for participation. The games can be posted to the social media feed at defined times to encourage the audience members to view the social media feed periodically to play new games. In some aspects, the game presents a plurality of product options to the audience member on a voting screen presents the results of the game the following day based on actual sales data.

In some aspects, designer users are notified when audience members provide feedback to their posts by sending push notifications to the designer users. Similarly, audience members can be notified when designers provide positive evaluations of the feedback by sending push notifications to the audience members.

In some embodiments, a social media-based product feedback platform includes a product feedback server comprising a processor, a memory communicatively coupled to the processor, and a network access device. The memory stores instructions executable by the processor to: receive posts from one or more designer computing devices; present the posts on a social media feed accessible by one or more consumer computing devices; receive feedback from the one or more consumer computing devices; present the feedback to the posts on the social media feed accessible by the one or more designer computing devices; receive evaluations of the feedback from the designer computing devices; and present the evaluations on the social media feed.

In some aspects, the memory further stores instructions executable by the processor to present rewards to the consumer computing device in response to the evaluations. The rewards can include one or more of points, coins, credit, gift cards, promotional codes, coupons, free items, and exclusive access to content.

In some cases, the system further includes an administration server comprising a processor, a memory communicatively coupled to the processor, and a network access device, the memory storing instructions executable by the processor to: receive permissions from the consumer computing devices to use feedback, and manage publication of feedback based on the permissions. The permissions can include permission to share feedback on a public website. In some aspects, the permissions include permission to share feedback with third party designer computing devices.

In some aspects, the system is configured to present games on the social media feed accessible by the consumer computing devices, receive instructions from consumer computing devices to interact with the games, and communicate rewards to the consumer computing devices.

In some embodiments, a social media-based product feedback platform includes a product feedback server. The product feedback server includes a social media interface engine for presenting posts and feedback on a social media feed, a consumer reward engine for communicating rewards to consumer users and accounting for rewards, a public website integration engine for communicating feedback content from the social media feed to a publicly accessible website, and a gaming engine for generating games and posting the games on the social media feed. The platform further includes an administrative server which includes a posting management engine for managing timing and content of posts to the social media feed, a licensing engine for managing licenses to third parties, a permissions engine for managing permissions granted from users regarding content on the social media feed, and a public web server for integrating the social media feed content with a public website. The platform can further include a plurality of mobile computing devices each comprising a processing unit, a memory, and an input/output unit, the plurality of mobile computing devices providing access to a social media feed presented by the product feedback server and the public website.

Referring first to FIG. 1, a diagram of an example system 100 in which feedback can be solicited is illustrated. In the example shown, audience members can be consumers of a potential or actual product or service; as such, the audience members selected to provide feedback in this example system correspond to "consumers" (although the present disclosure is not so limited). Accordingly, the system 100 can include a product feedback server 102, an administration server 104, an application store server 106, a public web server 108, and a sales data store 110 are connected through a network 112 with a consumer user computing device 114, a designer user computing device 116, a third party computing device 118, and an administrator computing device 120. Some embodiments of the system 110 may have greater or fewer components connected through the network 112. For example, multiple computing devices can connect through the network 112 at once.

The product feedback server 102 operates to generate and regulate a social media feed. The social media feed displays posts and feedback. The product feedback server 102 is further described in FIG. 2.

The administration server 104 operates to regulate permissions and licenses for users of the social media feed. Use of the social media-based platform by third parties is regulated by the administration server 104. The administration server 104 is further described in FIG. 3.

The application store server 106 operates to provide computing applications that are available to be downloaded by computing devices such as the consumer user computing device 114, the designer user computing device 116, and the third party computing device 118 through the network 112. Examples of applications stores include the Apple iTunes store and Google Play.

The public web server 108 operates to provide a public website accessible through the network 112. In some embodiments, the public website is associated with a particular retailer or product. In some embodiments, consumer reviews are presented on the public website. In particular embodiments of the invention, the consumer reviews are populated from content provided as feedback from consumer users.

The sales data store 110 operates to store data obtained from one or more retailers. In some embodiments, the sales data 110 is utilized in sales prediction games that are integrated into the social media feed. These sales prediction games are further described with respect to FIGS. 21-24.

The network 112 is an electronic communication network that facilitates communication between the computing devices 114, 116, 118, 120, the servers 102, 104, 106, 108, and the data stores including the sales data store 110. An electronic communication network includes a set of computing devices and links between the computing devices. The computing devices in the network use the links to enable communication among the computing devices in the network. The network 112 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 112 includes various types of links. For example, the network 112 can include wired and/or wireless links, including Bluetooth, ultra-wideband (UWB), 802.11, ZigBee, cellular, and other types of wireless links. Furthermore, in various embodiments, the network 112 is implemented at various scales. For example, the network 112 can be implemented as one or more local area networks (LANs), metropolitan area networks, subnets, wide area networks (such as the Internet), or can be implemented at another scale. Further, in some embodiments, the network 112 includes multiple networks, which may be of the same type or of multiple different types.

The consumer user computing device 114, the designer user computing device 116, the third party computing device 118, and the administrator computing device 120 operate to connect to one or more of the product feedback server 102, administration server 104, the application store server 106, and the public web server 108 through the network 112. The computing devices 114, 116, 118, 120 may have similar components, or may have different components. The computing devices are further described in FIG. 4.

The consumer user computing device 114 operates to access the product feedback server 102 and communicate with the social media feed through the network 112. The social media feed is displayed on the consumer user computing device 114 and inputs are received from a consumer user to leave feedback to posts on the social media feed. Methods of interacting with the social media feed through a consumer user computing device 114 are further described with respect to FIGS. 11-15, 18-19, 22-24, and 26-28.

The designer user computing device 116 operates to access the product feedback server 102 and communicate with the social media feed through the network 112. The social media feed is displayed on the designer user computing device 116 and inputs are received from a designer user to publish posts on the social media feed. Methods of interacting with the social media feed through a designer user computing device 116 are further described with respect to FIGS. 6-10 and 16-17.

In some embodiments, the third party computing device 118 operates to access the product feedback server 102 and communicate with the social media feed through the network 112. Third party computing devices 118 may be operated by third party designers who wish to receive feedback from the same consumer users that the designers users have access to. The third party computing device 118 interacts with the administration server 104 to determine the level of access that the third party computing device 118 has to the social media feed.

The administrator computing device 120 operates to access the product feedback server 102 and the administration server 104 through the network 112. The administrator computing device 120 may be operated by a user who manages licenses and permissions for one or more retailers or other entities associated with the social media feed.

Figure 2:
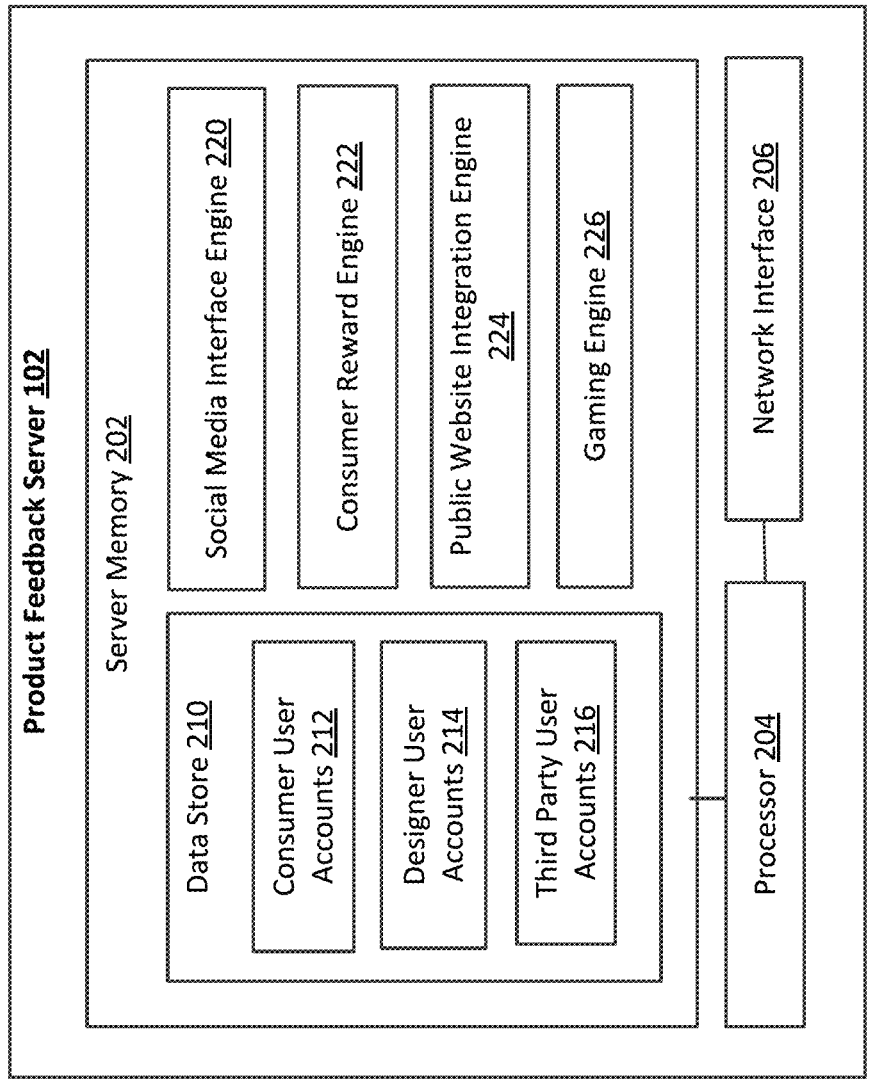
FIG. 2 illustrates an example block diagram of a product feedback server useable in the context of FIG. 1.

Referring now to FIG. 2, an example block diagram of a product feedback server 102 is shown that is useable to implement aspects of the system 100 of FIG. 1. The product feedback server 102 can be used to generate and operate a social media-based platform for soliciting feedback from a curated audience, such as potential or actual product consumers.

In the embodiments shown, the product feedback server 102 includes at least a server memory 202, a processor 204, and a network interface 206. In some embodiments, the server memory 202 includes a data store 210. The data store 210 stores information that is used in implementing the social media-based platform. In some embodiments, the data store 210 includes consumer user accounts 212, designer user accounts 214, and third party user accounts 216. In the embodiments shown, the server memory 202 also includes a social media interface engine 220, a consumer reward engine 222, a public website integration engine 224, and a gaming engine 226.

In some embodiments, the social media interface engine 220 operates to generate a social media feed that enables two-way communication between designer users and consumer users. The social media feed is accessible through the network 112 by one or more of consumer user computing devices 114, designer user computing devices 116, third party computing devices 118, and administrator computing devices 120. In some embodiments, users gain access to the social media feed by downloading a computing application.

The social media interface engine 220 receives communications from designer users to publish posts on the social media feed. The posts include at least one of text, images, and videos. In some embodiments, the posts include both text and an image or video. The posts are displayed on the feed to be viewed by both designers and consumers. In some embodiments, the posts are displayed on a scrollable feed. In some embodiments, the posts displayed on the feed are filtered by the user's interests or by category. In still further embodiments, designer users can select a particular group of consumers to whom the communications/posts are directed. For example, designer users can identify consumers by interest, by activity in the computing application, or by activity/engagement in another social media platform with the entity/company associated with the designer, thereby indicating that the consumer is likely to provide feedback regarding the post.

Consumers can provide feedback in response to the posts. The social media interface engine 220 receives inputs from consumer users to provide feedback and publishes the feedback to the social media feed. In some embodiments, comments are presented in a collapsible display below the post. The designer users can then view the feedback.

The social media interface engine 220 communicates with the consumer user accounts, designer user accounts, and third party user accounts in order to mediate communications made through the social media feed.

Figure 17:
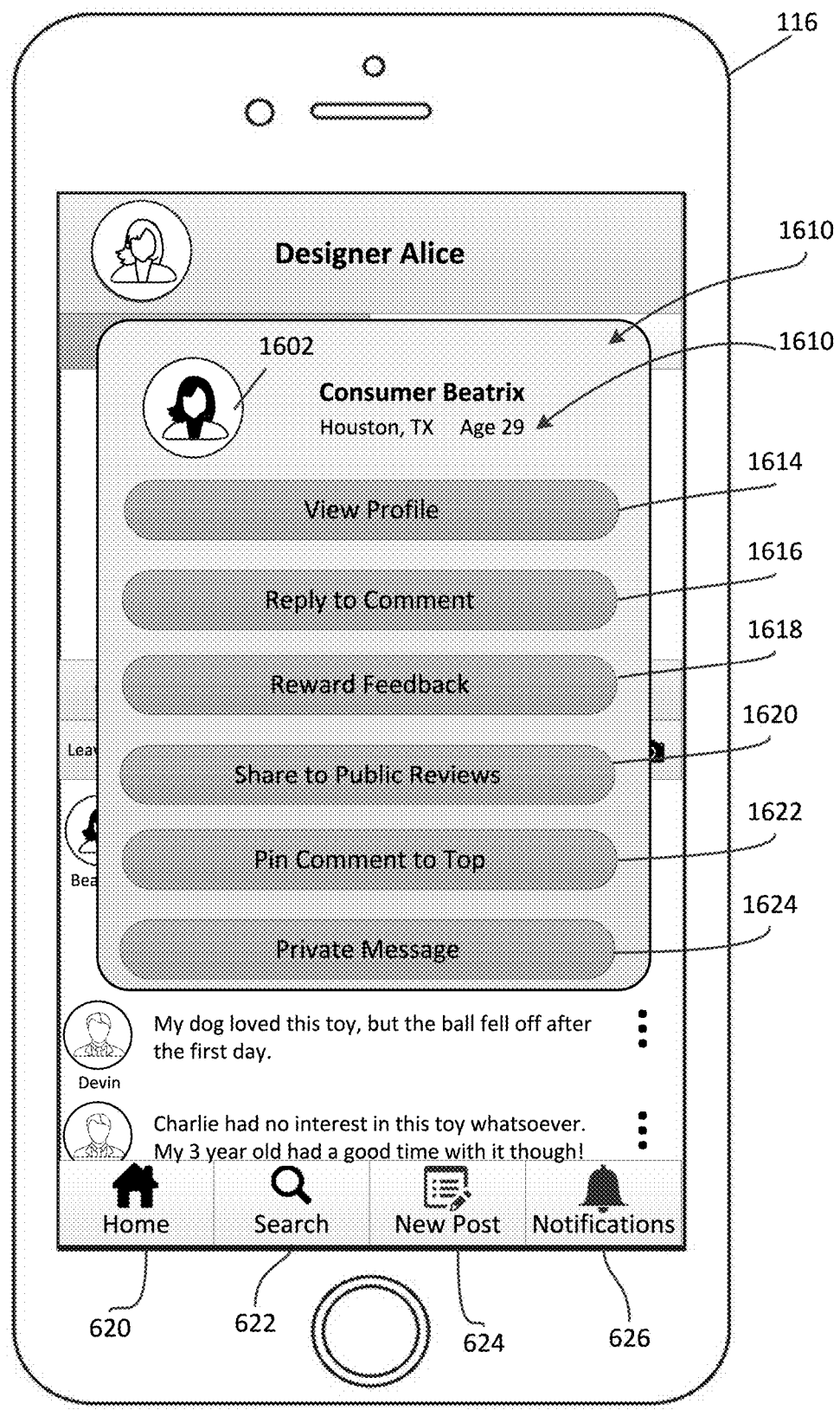
FIG. 17 shows another example of the designer user interface of FIG. 6.
Figure 18:
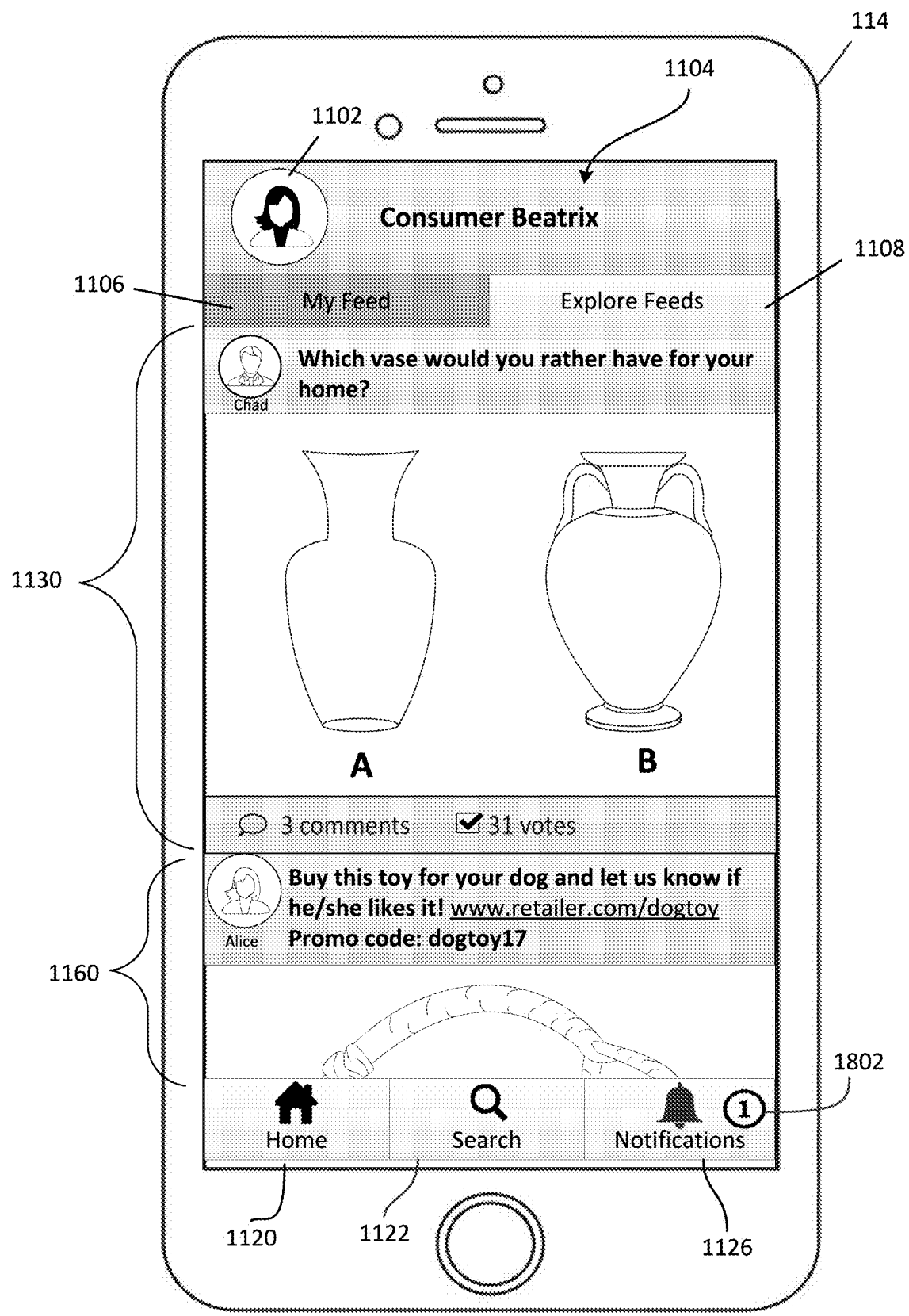
FIG. 18 shows another example of the audience member user interface of FIG. 11.
Figure 19:
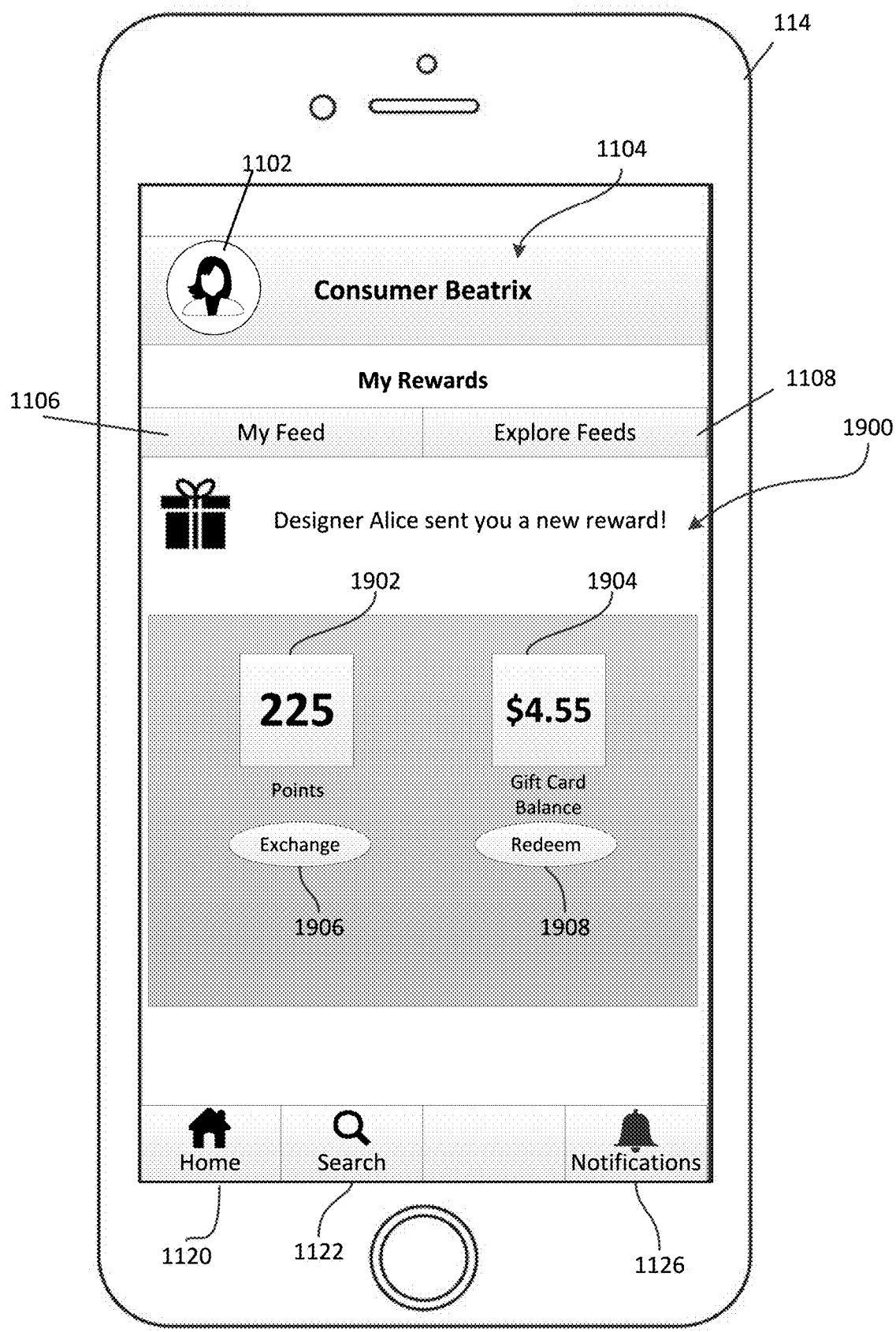
FIG. 19 shows another example of the audience member user interface of FIG. 11.

In some embodiments, the consumer reward engine 222 operates to communicate with the social media interface engine 220 and the user computers 114, 116, 118, 120 to mediate the awarding of rewards to consumers in exchange for quality feedback. In some embodiments, quality feedback is detailed and responsive to the designer user's request. The consumer reward engine 222 receives communications of positive evaluations of consumer feedback from designer users. The consumer reward engine 222 then notifies the consumer users of their receipt of rewards and records the rewards in the consumer user accounts 212. An example of rewarding a consumer for feedback is illustrated in FIGS. 17-19.

In some embodiments, the public website integration engine 224 operates to communicate with the social media interface engine 220 and one or more external public websites to enable posts and feedback from the social media feed to be published to the public website. Thus, posts provided within the private environment of the social media feed are transferred to the external public website. The website could be, for example, a website selling a particular product and the post is published as a review of the product. In some embodiments, the website is associated with the designer users or with a third party company. The public website integration engine 224 also communicates with the data store 210 to access information from the consumer user accounts 212, designer user accounts 214, and third party user accounts 216 to determine if the content from the posts and feedback was provided by a consumer that has granted permission to publish the feedback to public websites. An example of publishing user feedback to a public website is described with respect to FIG. 20.

In some embodiments, the gaming engine 226 operates to generate and present games on the social media feed. The gaming engine 226 communicates with the social media interface engine 220 to publish games to the social media feed. Consumer users can interact with the games on the social media feed to earn rewards. In some embodiments, the gaming engine 266 communicates with the consumer reward engine 222 and consumer user accounts 212 to record rewards earned by consumers users by playing the games. The gaming engine 226 communicates with the sales data store 110 shown in FIG. 1 to validate the results of games involving prediction of product sales. One example of such a game is illustrated in FIGS. 21-24.

The consumer user accounts 212 data store includes stored information relating to consumer interactions with the social media interface engine 220. Information about individual consumer users such as profile and preferences data is stored in the consumer user accounts 212. Profile data may include the user's name, location, age, and the like. Preferences data can include notification preferences and display preferences. In some embodiments, the consumer user accounts 212 records rewards data about rewards the consumer has received from interacting with the social media feed. For example, rewards data can include balances of gift card credit, point balances, and the like. FIG. 19 illustrates an example display of a consumer user's rewards account.

The designer user accounts 214 data store includes stored information relating to designer interactions with the social media interface engine 220. Information about individual designer users such as profile and preferences data is stored in the designer user accounts 214. The designer user's profile information may include a department, a company, and a role. The preferences data may include notifications and display preferences.

The third party user accounts 216 data store includes stored information relating to third party designer interactions with the social media interface engine 220. Information regarding third party permissions and licenses is stored in the third party user accounts 216 as well as information about individual third party users such as profile and preferences data.

The processor 204 executes instructions stored in the server memory 202. In some embodiments, the processor 204 comprises one or more central processing units (CPU). In other embodiments, the processor 204 additionally or alternatively includes one or more digital signal processors, field-programmable gate arrays, or other electronic circuits.

The network interface 206 operates to communicate with the network 112. The network interface 206 may be wired or wireless. Examples of wireless network interfaces include infrared, BLUETOOTH® wireless technology, 802.11a/b/g/n/ac, and cellular or other radio frequency interfaces.

Figure 3:
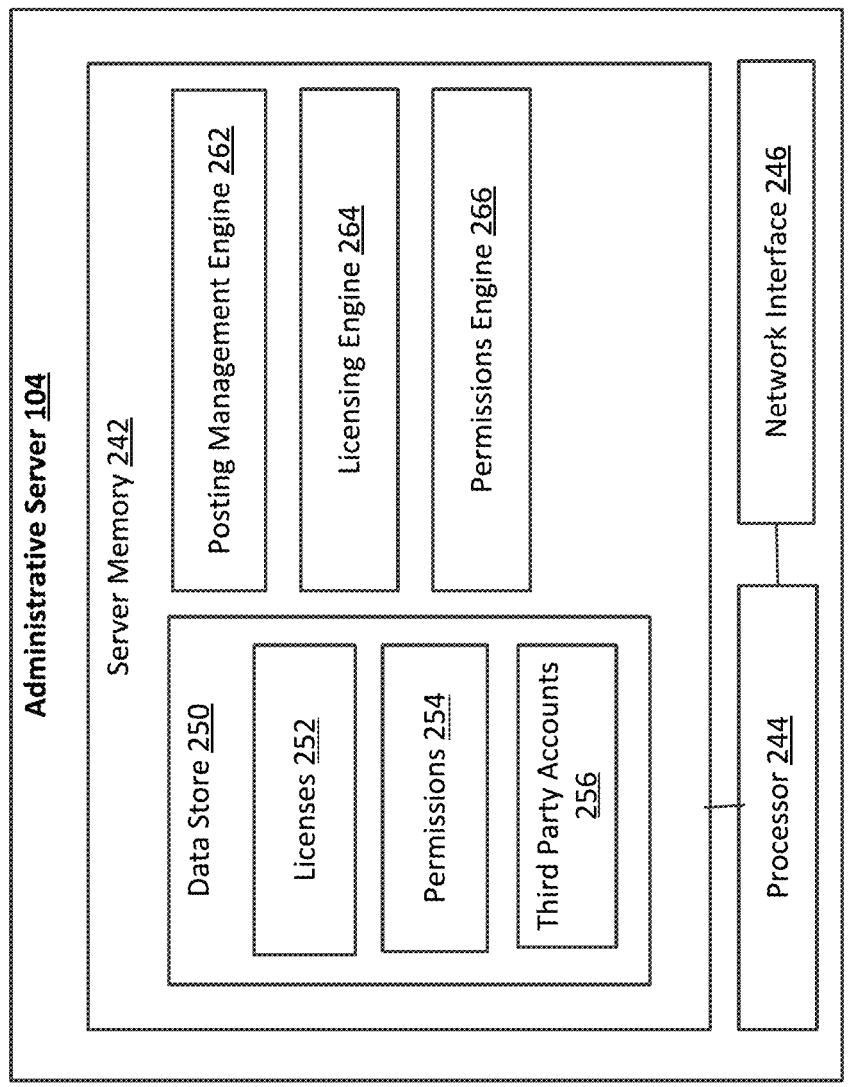
FIG. 3 illustrates an example block diagram of an administration server useable in the context of FIG. 1.

Referring now to FIG. 3, an example block diagram of an administrative server 104 is shown that is useable to implement aspects of the system 100 of FIG. 1. The administrative server 104 can be used to manage post activity on the social media feed. The administrative server 104 also operates to manage licenses and permissions the govern interactions between designer users, consumer users, and third party users. The administrative server 104 operates in conjunction with one or more administrator computing devices 120.

In the embodiments shown, the administrative server 104 includes at least a server memory 242, a processor 244, and a network interface 246. In some embodiments, the server memory 242 includes a data store 250. The data store 250 stores information that is used in managing the social media-based platform. In some embodiments, the data store 250 includes licenses 252, permissions 254, and third party accounts 256. In the embodiments shown, the server memory 242 also includes a posting management engine 262, a licensing engine 264, and a permissions engine 266.

In some embodiments, the posting management engine 262 operates to communicate with the social media interface engine 220 to regulate communications that are displayed on the social media feed. The posting management engine 262 accesses information in the data store 250 to determine which users can view particular content on the social media feed. In some embodiments, the posting management engine 262 monitors content posted on the social media feed and removes content that is inappropriate or offensive. The posting management engine 262 also regulates the frequency and volume of posts being published to the social media feed. In some embodiments, the total number of posts will be limited over a period of time so as not to overwhelm the consumer users. In some embodiments, posts will be limited on the basis of number of posts per designer, per company, per category, or per audience.

In some embodiments, the licensing engine 264 operates to regulate third party access to the social media-based platform. In some embodiments, the licensing engine 264 uses the licenses 252 to determine which features third party users can access in the social media-based platform. In some embodiments, the third party uses the social media-based platform to interact with its own customers. In other embodiments, the third party uses the social media-based platform to interact with the customers of another company.

In some embodiments, the permissions engine 266 operates to regulate how user generated information and content is used and which users have access to it. In some embodiments, the permissions engine 266 uses the permission 254 data to determine if consumer user generated content on the social media feed can be published to a public website. In some embodiments, the permissions engine 266 uses the permission 254 data to determine which information about consumer users is accessible by designer users. The permissions engine 266 also regulates the permissions that consumer users grant to third party designers.

The licenses 252 data store includes information regarding licenses and agreements made between third party users and administrators of the social media-based platform. Such licenses may govern which information and data in the social media-based platform that can be accessed by a third party. Other agreements may govern compensation structures for use of the social media-based platform.

The permissions 254 data store includes information regarding permissions granted by users of the social media-based platform. For example, consumer users may be asked to permit designer users to use feedback provided by the consumer user and publish the feedback to areas outside of the closed social media-based platform such as a public website. Permissions may also govern which information about a consumer user is accessible by designer users or other consumer users. In another example, consumers may be asked to give permission for the social media-based platform to access content on the consumer user's computing device 114 such as images, videos, and other media content. The permissions 254 data store also includes information relating to permissions that consumer users grant to third party users.

The third party accounts 256 data store includes information about third party users. In some embodiments, third party users are designers that want to receive product feedback from the consumer users that are invited to the social media-based platform. The consumer users may or may not be customers of the third party. In some embodiments, the third party accounts 256 data store includes identifying information about third party users such as the business name with which the third party designer users are affiliated, a location of the third party headquarters, and what kind of products the third party sells.

The processor 244 operates in the same manner as the processor 204 as described above with respect to FIG. 2. The network interface 246 also operates in the same manner as the processor 206 as described above with respect to FIG. 2.

Figure 4:
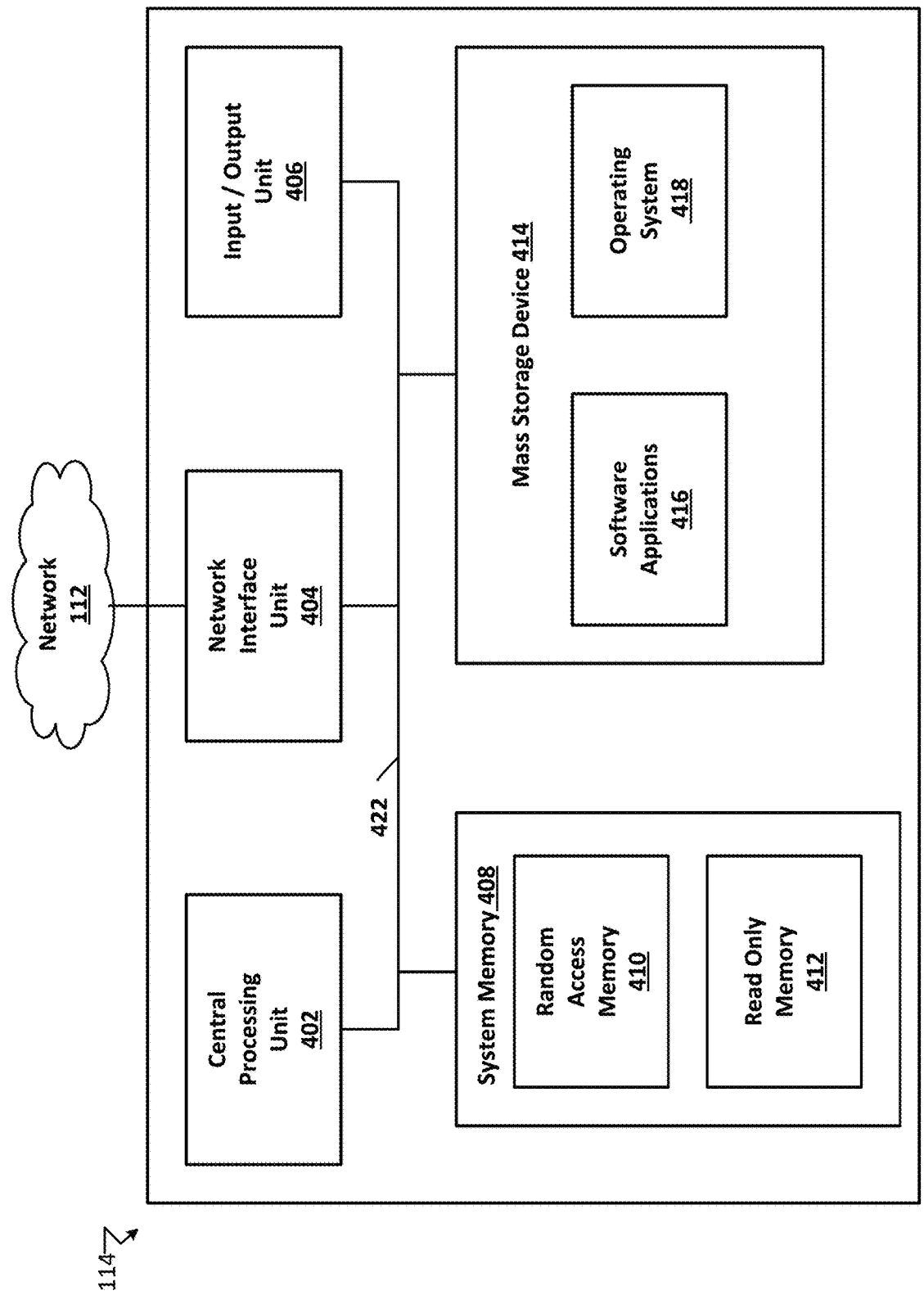
FIG. 4 illustrates an example block diagram of a computing device useable in the context of FIG. 1.

In FIG. 4, an example block diagram of a consumer user computing device 114 is shown that is useable to implement aspects of the system 100 of FIG. 1. The computing device 114 has the same components as the designer user computing device 116, third party computing device 118, and administrator computing device 120, in example aspects.

In the embodiment shown, the computing device 114 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 114, such as during startup, is stored in the ROM 412. The computing device 114 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 114. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 114.

According to various embodiments of the invention, the computing device 114 may operate in a networked environment using logical connections to remote network devices through a network 112, such as a wireless network, the Internet, or another type of network. The computing device 114 may connect to the network 112 through a network interface unit 404 connected to the system bus 422. It should be appreciated that the network interface unit 404 may also be utilized to connect to other types of networks and remote computing systems. The computing device 114 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 114 can store software instructions and data. The software instructions include an operating system 418 suitable for controlling the operation of the computing device 114. The mass storage device 414 and/or the RAM 410 also store software instructions, that when executed by the CPU 402, cause the computing system 414 to provide the functionality of the computing device 114 discussed in this document. For example, the mass storage device 414 and/or the RAM 410 can store software instructions that, when executed by the CPU 402, cause the computing device 114 to receive and analyze data.

Figure 5:
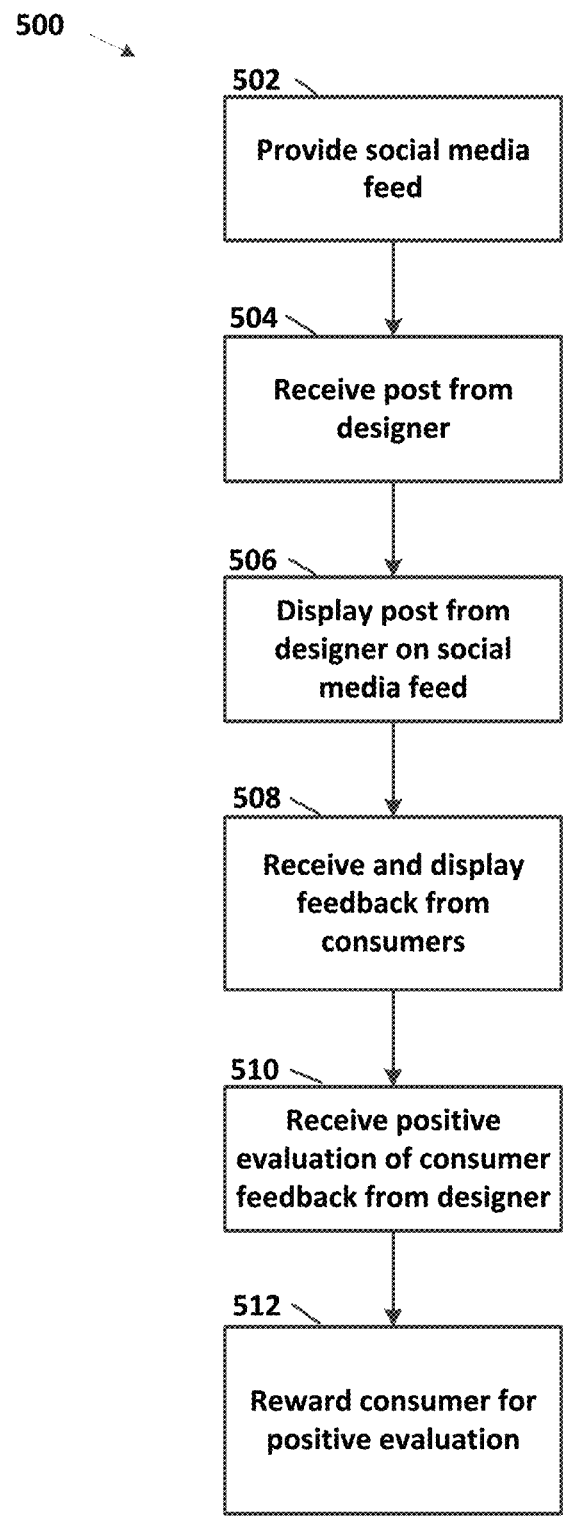
FIG. 5 is a flowchart of an example method for soliciting feedback performed by embodiments of the system of FIG. 1.

Referring now to FIG. 5, a flowchart for an example method 500 of soliciting feedback is illustrated. The method 500 can be performed using the systems of FIGS. 1-4. The method allows for two-way communication between a private audience, such as a private group of consumers and one or more product designers. The two-way communication occurs through a social media-based platform for soliciting feedback from the consumers.

Figure 7:
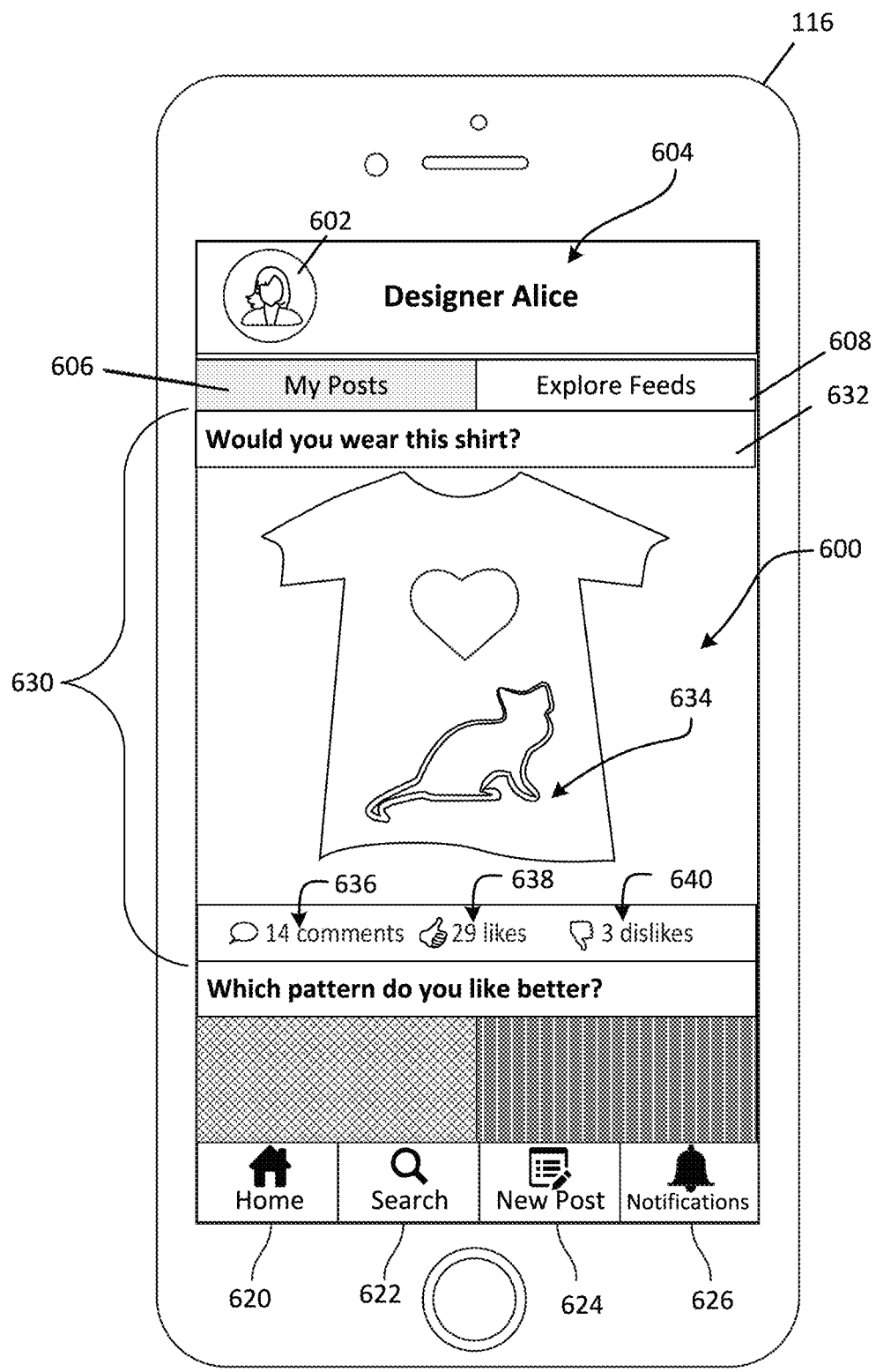
FIG. 7 shows another example of the designer user interface of FIG. 6.
Figure 12:
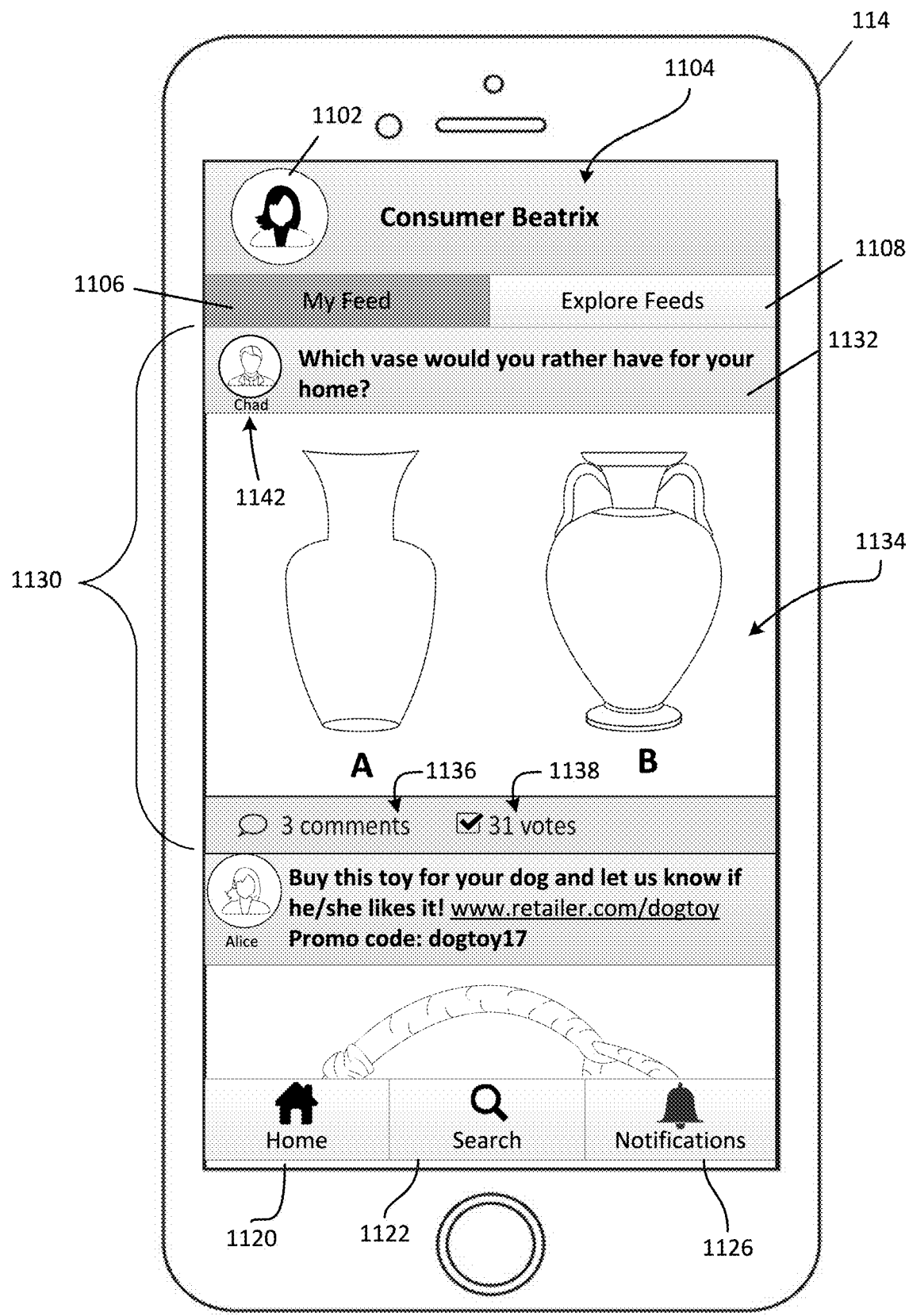
FIG. 12 shows another example of the audience member user interface of FIG. 11.

At operation 502, a social media feed is provided. In some embodiments, the social media feed is communicated through a network, such as the network 112 of FIG. 1 by the product feedback server 102. The social media interface engine 220 generates a visual interface that can be accessed by one or more computing devices, such as consumer user computing devices 114, designer user computing devices 116, and third party computing devices 118. In some embodiments, the computing devices must download a computing application first in order to access the social media feeds. In some embodiments, consumer users can only download the application after receiving an invitation to do so from designer users. Invitations may be extended based on designer users' interactions with consumers through other social media. In some embodiments, the social media feed visual interface includes images, videos, text, and audio. An example of the social media feed from a designer user perspective is shown in FIG. 7 and an example of the social media feed from a consumer user perspective is shown in FIG. 12.

At operation 504, a post is received from a designer user. The social media interface engine 220 receives a post communicated through the network 112 from a designer user computing device 116. A post includes one or more of images, videos, text, and audio relating to a product about which the designer user would like to receive feedback from a consumer user. In some embodiments, the post can include a poll asking consumer users to vote from two or more options. Posts may also ask for general feedback on an item or request feedback regarding a particular feature of an item.

Figure 9:
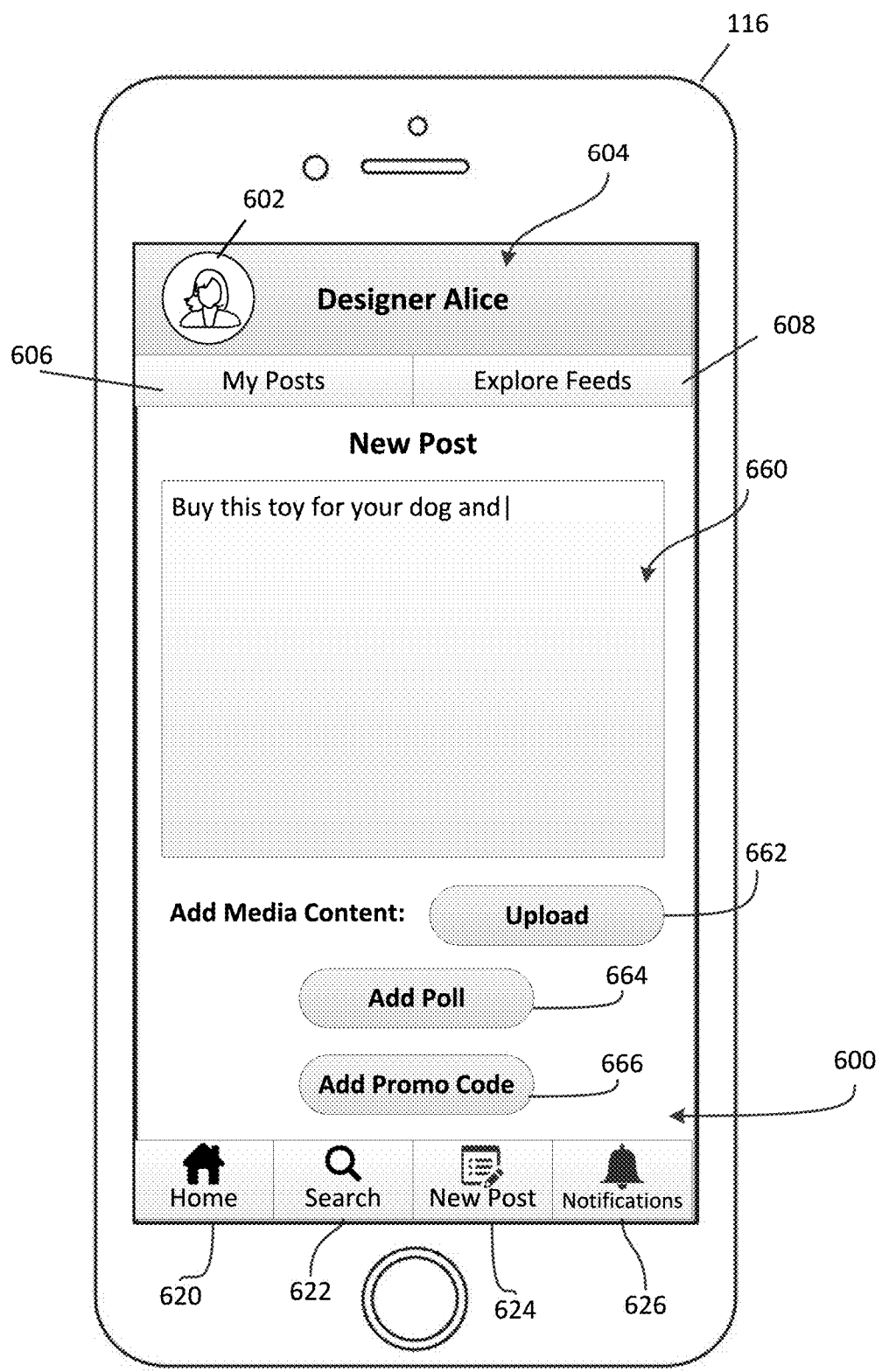
FIG. 9 shows another example of the designer user interface of FIG. 6.
Figure 10:
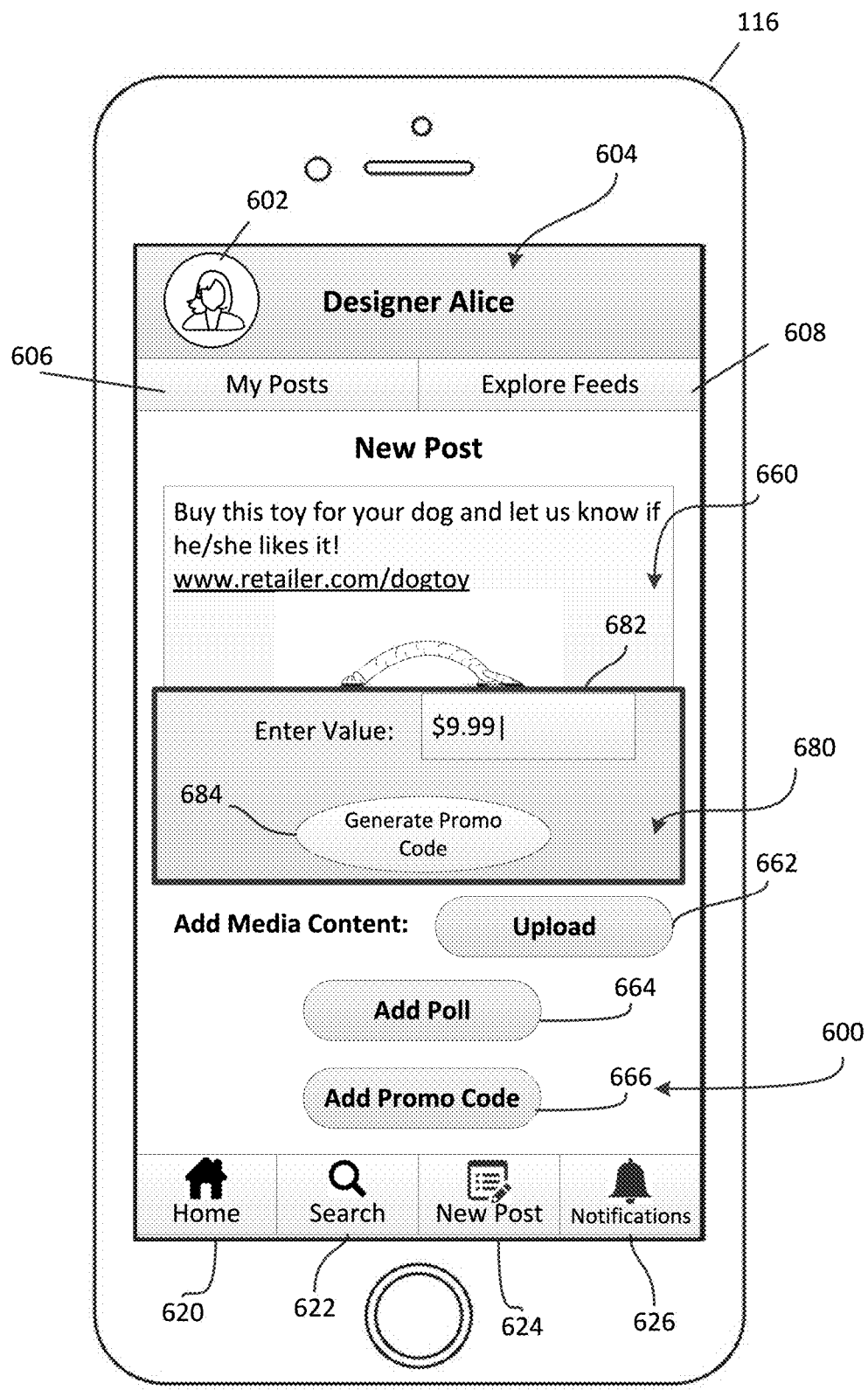
FIG. 10 shows another example of the designer user interface of FIG. 6.

In some embodiments, the post includes a request for consumer users to purchase an item and provide reviews of the product. In such embodiments, the post can optionally include a coupon or promotional code that can be used to offset part or all of the cost of the product. In other embodiments, the consumer user is reimbursed for part of all of the cost of the product after purchasing and leaving a review. Reimbursement could come in the form of credit or a gift card. An example of a designer user creating a post is shown in FIGS. 9-10.

At operation 506, the post is displayed on the social media feed. In some embodiments, the post is displayed with identifying information for the designer user who created the post. For example, identifying information could include a profile icon or profile picture. In some embodiments, the identifying information includes one or more of the designer user's name, location, position, age, and company. An example of a post being displayed on the social media feed is shown in FIGS. 7 and 12.

Figure 14:
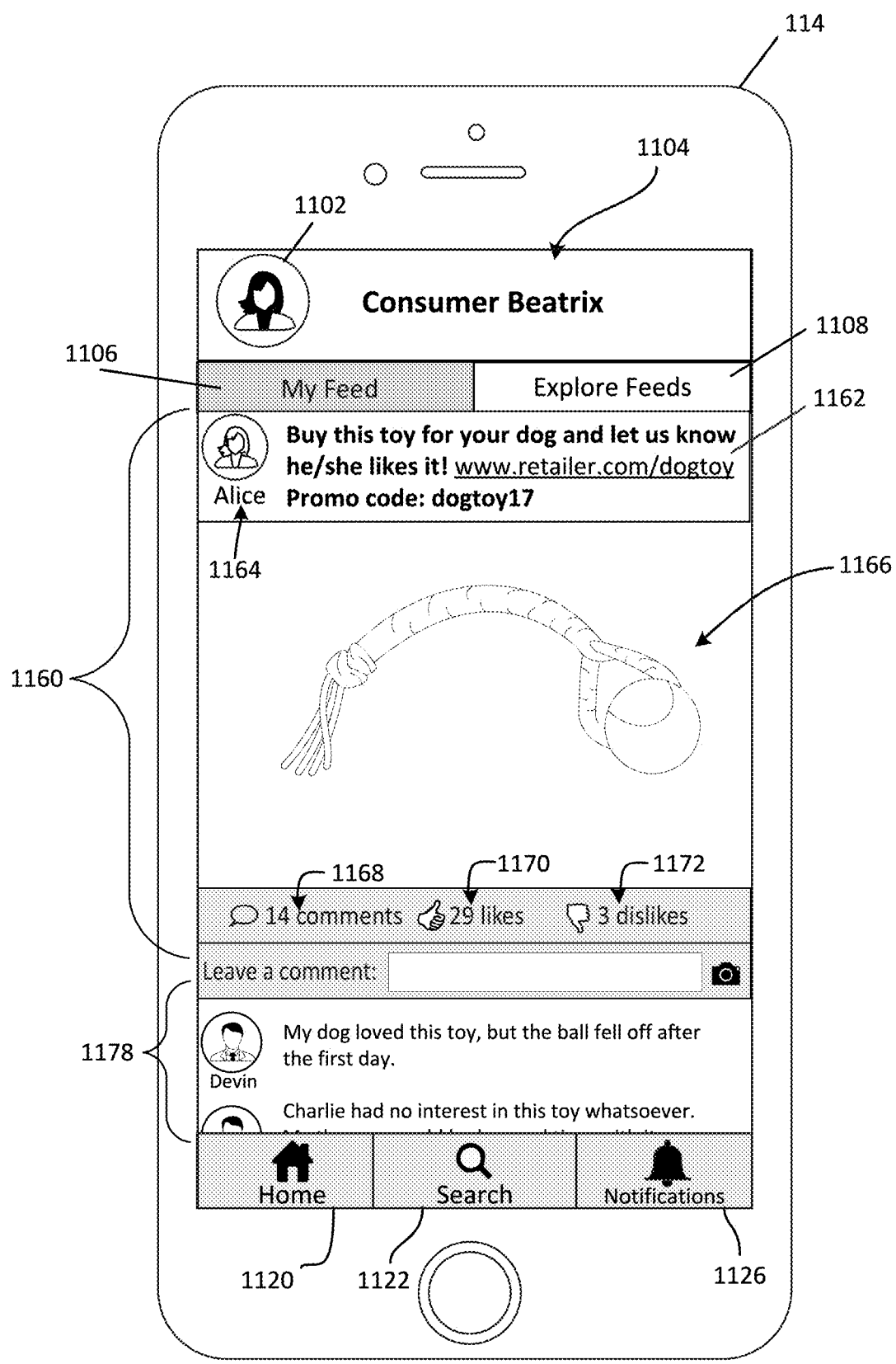
FIG. 14 shows another example of the audience member user interface of FIG. 11.
Figure 16:
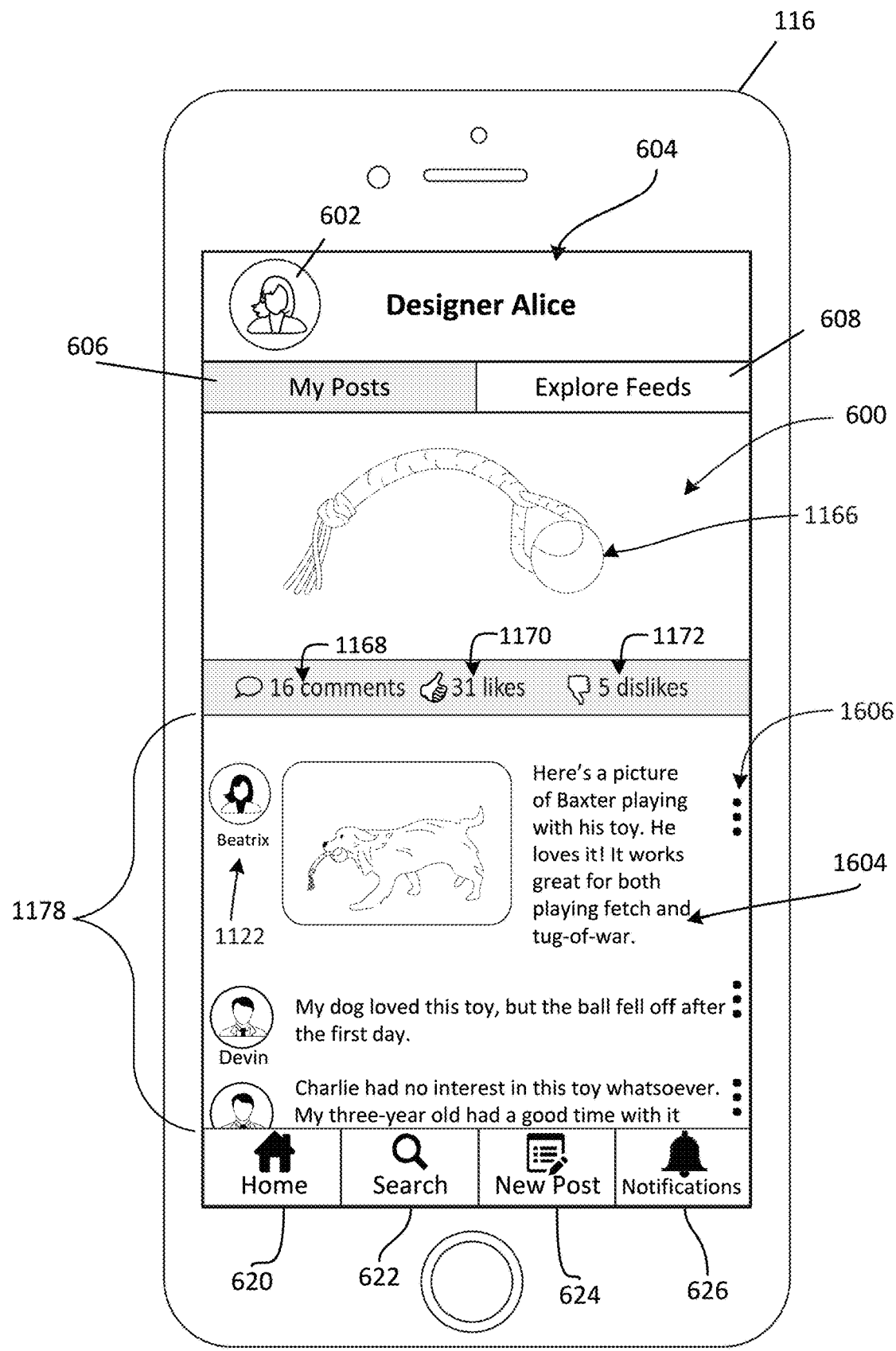
FIG. 16 shows another example of the designer user interface of FIG. 6.

At operation 508, feedback is received from consumer users. The social media interface engine 220 receives feedback through the network 112 from one or more consumer user computing devices 114. The feedback includes one or more of images, videos, text, and audio pertaining to the product in the post. Feedback may also come in the form of votes, likes, and other non-verbal responses. The feedback is displayed on the social media feed in connection to the post to which the feedback is responding. In some embodiments, the feedback is only displayed if a selection is made on the post to expand the view. For example, if the feedback is a comment, the post may indicate that there 57 comments, but will not display each and every comment. To view the comments, the user may need to select the comments to expand the display and scroll through the posted comments. An example of consumer feedback is shown in FIGS. 14 and 16.

At operation 510, a positive evaluation of the consumer's feedback is received from the designer user. A positive evaluation can come in the form of a "like," a star, or other indication that the designer user appreciate the feedback from the consumer user. In some embodiments, the indication of positive evaluation is displayed on the post for other users to view. In other embodiments, the positive evaluation is sent directly from the designer user to the consumer user through a message or through the delivery of a notification that the consumer user is receiving a reward. In some embodiments, the positive evaluation is inferred from an action made by the designer user such as pinning a comment including feedback to the top of a comment section for a post or sharing feedback to a public website.

At operation 512, a reward is provided to the consumer user for his or her feedback. In some embodiments, the consumer user will receive a notification that he or she has received a reward. In other embodiments, the reward will appear in the consumer user's account. In some embodiments, the reward is a monetary award such as store credit or a gift card. In some embodiments, the reward is a discount such as a promotional code or a coupon. In other embodiments, the reward is a free product, access to exclusive content, or an invitation to an event. For example, a consumer user who provides valuable feedback on women's clothing may be invited to a fashion show as a reward. Different point values may be awarded to a consumer automatically based on actions of designer users. For example, if a consumer user's feedback is "liked" or "starred" by the designer user, the consumer user will receive 1 point. If the consumer user's feedback is pinned, 5 points are awarded. If the consumer user's feedback is published to a public website the consumer users receives 10 points. FIG. 19 illustrates an example of a consumer user receiving a reward.

Figure 6:
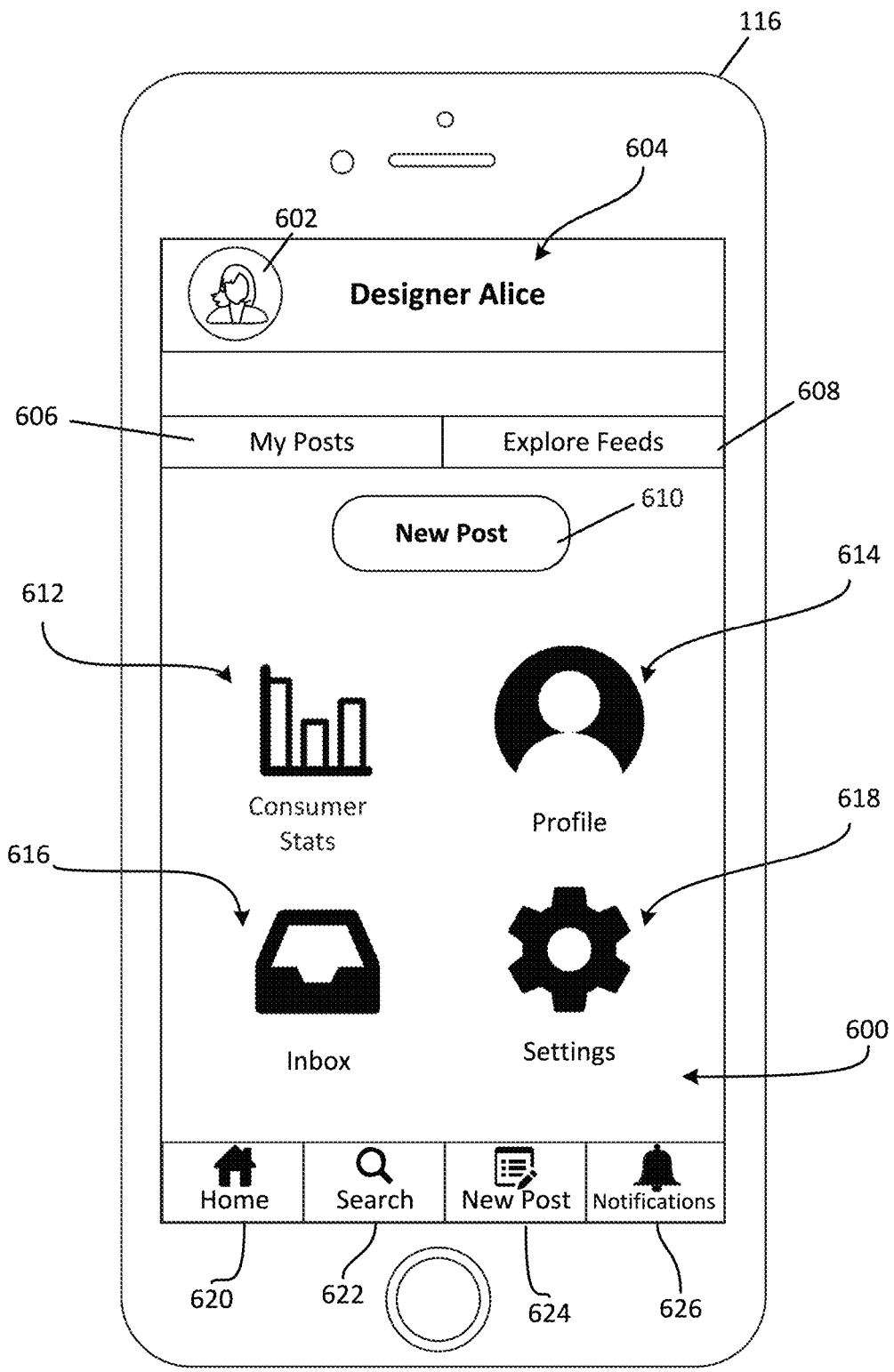
FIG. 6 shows an example of a designer user interface implemented on the computing device of FIG. 4.

FIG. 6 depicts an example user interface 600 for a designer user implemented on the designer user computing device 116. In the example shown in FIG. 6, the user interface 600 is displaying a home page for the designer user, Alice. A profile icon 602 and the user's name 604 are displayed on the user interface 600. The user could upload a photograph of themselves to use as the profile icon 602. Alternatively, a generic icon could be shown, or no icon.

In some aspects, the user interface 600 displays tabs for "My Posts" 606 and "Explore Feeds" 608. In some embodiments, the tabs are displayed on all views of the user interface 600. Selecting "My Posts" 606 displays posts that the designer user has published to the social media feed. Selecting "Explore Feeds" 608 displays different feeds filtered by content. Selecting the "New Post" button 610 will open a new screen where the designer user can create a new post.

In some embodiments, the home page also includes icons for "Consumer Stats" 612, "Profile" 614, "Inbox" 616, and "Settings" 618. Selecting "Consumer Stats" 612 displays information about consumers that have responded with feedback to posts published by the designer user. Selecting "Profile" 614 displays options for creating and editing a user profile. In this example, Alice could select "Profile" 614 to edit her profile icon 602, user name 604, and other information. Other information could include one or more of an email address, a cell phone number, a location, and a website. Selecting "Inbox" 616 accesses a view of the user interface 600 displaying messages that the user has sent and received. Selecting "Settings" 618 displays options governing the user's experience with the social media-based platform. In some embodiments, settings can include one or more of display options for social media feeds, notification options, and other preferences.

Also shown on the user interface 600 for the designer user is a "Home" button 620, a "Search" button 622, a "New post" button 624, and a "Notifications" button 626. In some embodiments, these buttons are displayed on every page of the user interface 600. Selecting the "Home" button 620 from any other view of the user interface 600 will return the display to the home page, as shown in FIG. 6. Selecting the "Search" button 622 will enable a search function to be displayed. The designer user can perform a text search of content within the social media feeds. For example, Designer Alice could search for "baby clothes" to display all posts relating to baby clothes products and any feedback mentioning baby clothes. Selecting the "New Post" button 624 will enable the designer user to create a post, and operates in the same way as the "New Post" button 610. The "Notifications" button 626 can be selected to display notifications for the user. In some embodiments, the number of new notifications is displayed on the "Notifications" button 620.

FIG. 7 depicts another example view of the user interface 600 for a designer user. In this view, the designer user has selected the "My Posts" tab 606. Posts published to the social media feed by the designer user are displayed. In this example, a post 630 is shown with a text portion 632 with the query, "Would you wear this shirt?". An image 634 accompanies the text, depicting a shirt. In some embodiments, the posts can include indicators of feedback that has been received for the post. In this embodiment, indicators for comments 636, likes 638, and dislikes 640 are displayed. In some embodiments, the indicators show how many comments, likes, and dislikes have been accumulated for each post. In this example, 14 comments have been received from other users in response to the post, 29 users have liked the post, and 3 users have disliked the post.

Figure 8:
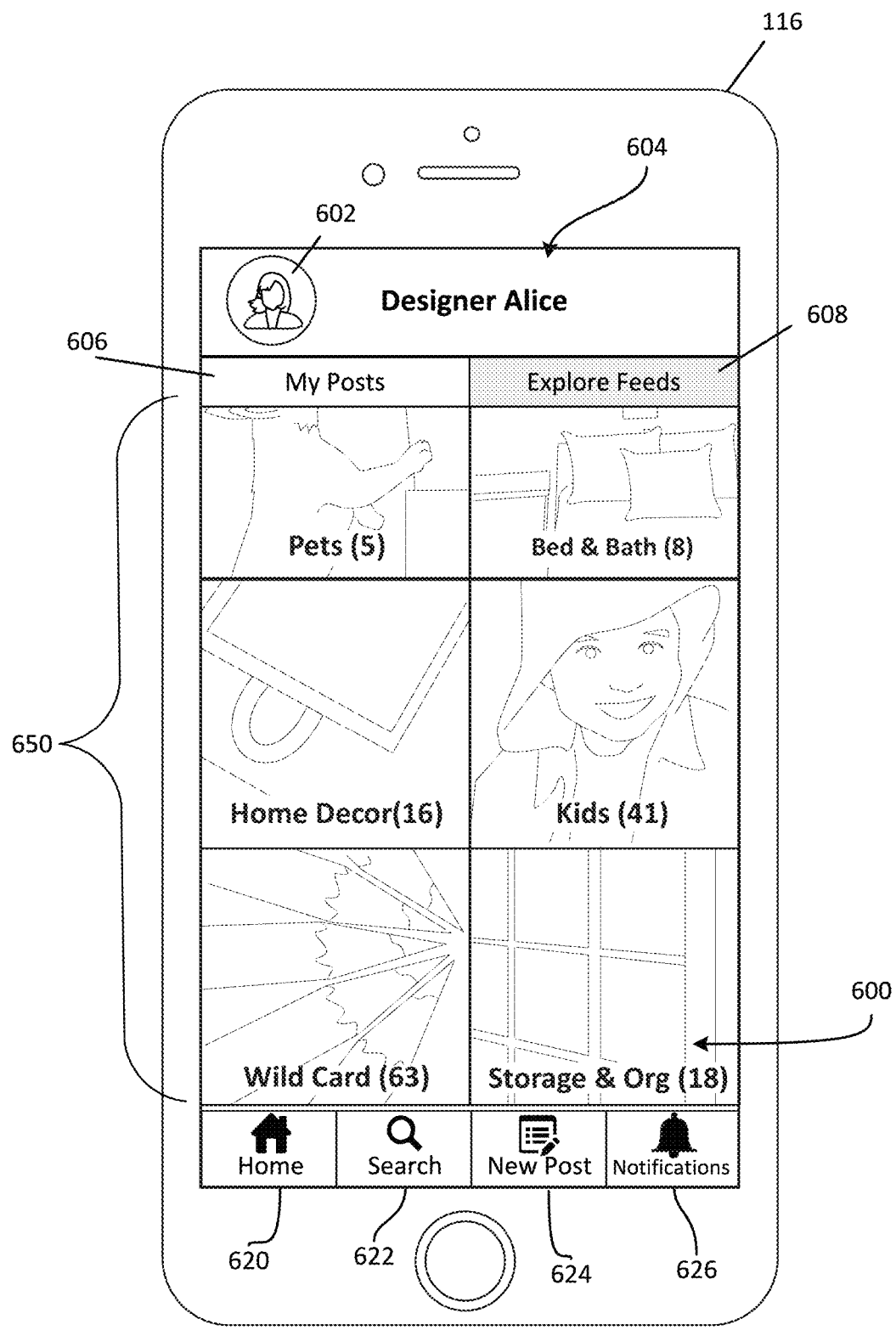
FIG. 8 shows another example of the designer user interface of FIG. 6.

FIG. 8 depicts another example view of the user interface 600 for a designer user. In this example, Designer Alice has selected the "Explore Feeds" tab 608. The feeds 650 are displayed on the user interface 600 for selection by the designer user. In some embodiments, the feeds are categorized by types of products, such as clothing, pet supplies, and bedding. In other embodiments, the feeds are categorized by the types of consumers that might buy or use the products, such as women, boys aged 3 to 5 years, and dogs. In yet other embodiments, the feeds are categorized by other criteria such as new products, product in development, most popular products, and the like. In the embodiment shown in FIG. 8, the feeds 650 shown have the categories of "Pets," "Bed & Bath," "Home Décor," "Kids," "Wild Card," and "Storage & Org."

FIG. 9 depicts another example view of the user interface 600 for designer users that is shown when the user selects "New Post" 624. The effect is achieved by selecting the "New Post" button 610 as shown in FIG. 6. In this example, Designer Alice has started to enter text into a text box 660. Also shown is an "Upload" button 662 that allows the designer user to upload media content to include in a post. Media content can include one or more of images, videos, and audio. The designer user can also select the "Add Poll" button 664 to include a poll in the post. In some embodiments, the poll presents options that a consumer user can select from to vote on aspects of a product in response to a query posted by a designer user. Selecting the "Add Promo Code" button 666 allows the designer user to include a promotional code in a post. The promotional code can be used by a consumer to receive a discount when purchasing a product.

FIG. 10 depicts another example view of the user interface 600 for designer users that is shown when a designer user is creating a new post. In this example, Designer Alice has finished entering text into the text box 660 and has already uploaded an image. Designer Alice has selected the "Add Promo Code" button 666 to include a promotional code in the post. A pop-up box 680 is shown where a value for the promotional code can be entered into the value box 682 and the promotional code is generated for the value after the user selects the "Generate Promo Code" button 684. If a consumer user enters the promotional code when purchasing the product featured in the post, the consumer will receive a $9.99 discount on the purchase price.

Figure 11:
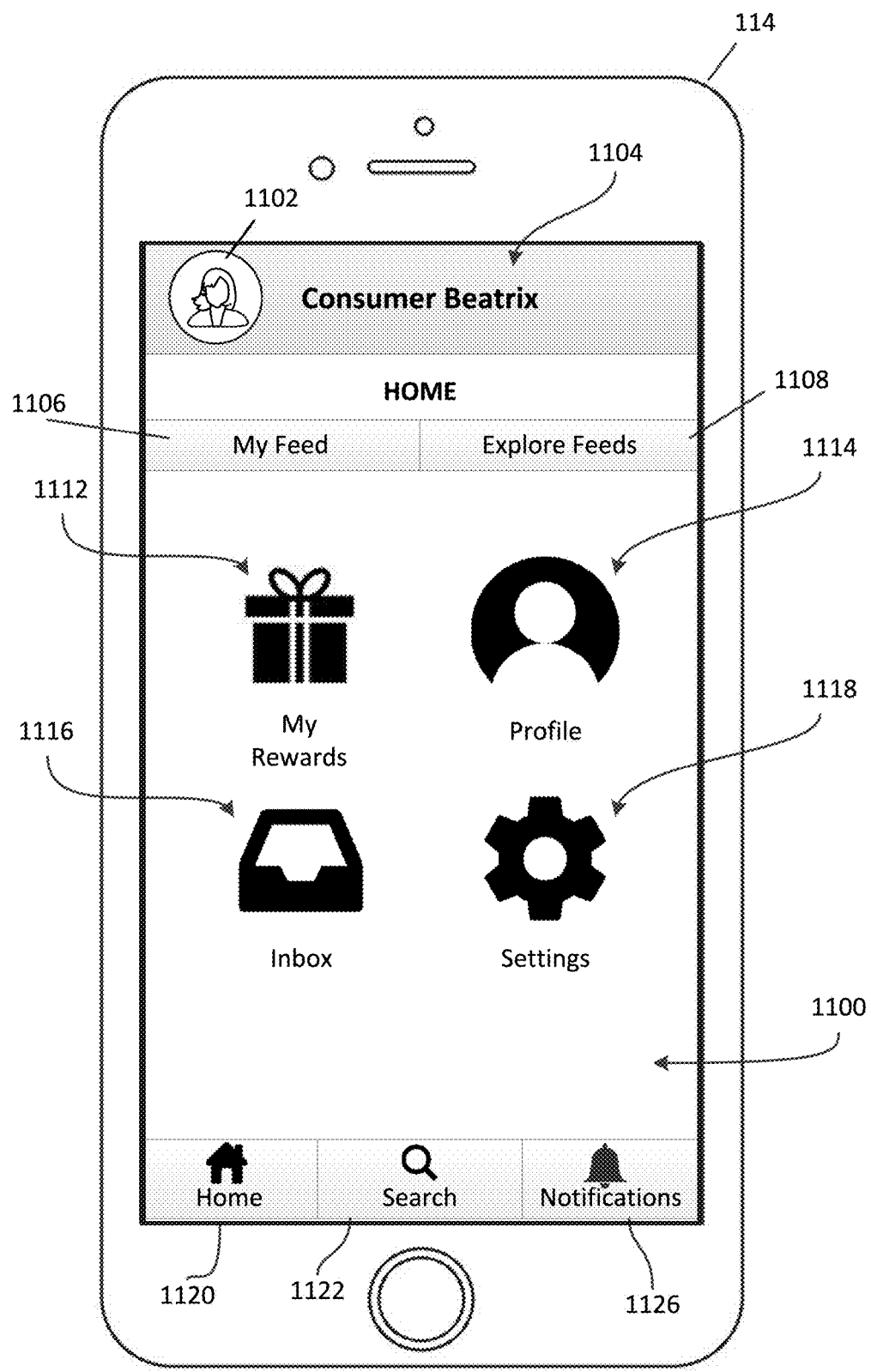
FIG. 11 shows an example of an audience member user interface implemented on the computing device of FIG. 4.

FIG. 11 depicts an example user interface 1100 for a consumer user implemented on the consumer user computing device 114. In the example shown in FIG. 11, the user interface 1100 is displaying a home page for the consumer user, Beatrix. A profile icon 1102 and the user's name 1104 are displayed on the user interface 1100. The user could upload a photograph of themselves to use as the profile icon 1102. Alternatively, a generic icon could be shown, or no icon. An example of a consumer user profile setup is described with respect to FIGS. 26-28.

In some aspects, the user interface 1100 displays tabs for "My Feed" 1106 and "Explore Feeds" 1108. In some embodiments, the tabs are displayed on all views of the user interface 1100. Selecting "My Feed" 1106 displays posts that are relevant to the consumer user. In some embodiments, the consumer user can select to follow particular feeds based on categories or interests. In other embodiments, the posts shown on the user's feed are automatically selected for the consumer based on the consumer's previous interactions with posts. Selecting "Explore Feeds" 1108 displays different feeds filtered by content.

In some embodiments, the home page also includes icons for "My Rewards" 1112, "Profile" 1114, "Inbox" 1116, and "Settings" 1118. Selecting "My Rewards" 1112 displays an accounting of the rewards that the consumer user has received. In some embodiments, the consumer user can access "My Rewards" 1112 to exchange points for store credit. Selecting "Profile" 1114 displays options for creating and editing a user profile. In this example, Beatrix could select "Profile" 1114 to edit her profile icon 1102, user name 1104, and other information. Other information could include one or more of an email address, a cell phone number, a location, and a website. Selecting "Inbox" 1116 accesses a view of the user interface 1100 displaying messages that the user has sent and received. Selecting "Settings" 1118 displays options governing the user's experience with the social media-based platform. In some embodiments, settings can include one or more of display preferences for social media feeds, notification options, permissions, sound options, and category selections.

Also shown on the user interface 1100 for the designer user is a "Home" button 1120, a "Search" button 1122, and a "Notifications" button 1126. In some embodiments, these buttons are displayed on every page of the user interface 1100. Selecting the "Home" button 1120 from any other view of the user interface 1100 will return the display to the home page, as shown in FIG. 11. Selecting the "Search" button 1122 will enable a search function to be displayed. The consumer user can perform a text search of content within the social media feeds. For example, Consumer Beatrix could search for "dog toys" to display all posts relating to dog toy products. The "Notifications" button 1126 can be selected to display notifications for the user. In some embodiments, the number of new notifications is displayed on the "Notifications" button 1126.

FIG. 12 depicts another example view of the user interface 1100 for a consumer user. In this view, the consumer user has selected the "My Feed" tab 1106. Posts pertinent to the consumer user's interests are displayed on the social media feed. In this example, a post 1130 is shown with a text portion 1132 with the query, "Which vase would you rather have for your home?" that was posted by a designer, Chad, as indicated by the profile icon 1142. An image 1134 accompanies the text, depicting two vases. In some embodiments, the posts can include indicators of feedback that has been received for the post. In this embodiment, indicators for comments 1136, and votes 1138 are displayed. In this example, 3 comments have been received from other users in response to the post, and 31 votes have been received for the post. In this example, the votes indicate consumer users' preferences for vase "A" versus vase "B" as shown in the image 1134. Consumer Beatrix could click on the comments 1136 or the votes 1138 to display comments and votes that were left as feedback from other consumer users. Selecting comments 1136 or votes 1138 will also allow Consumer Beatrix to leave feedback as a comment or a vote on the post 1130.

Figure 13:
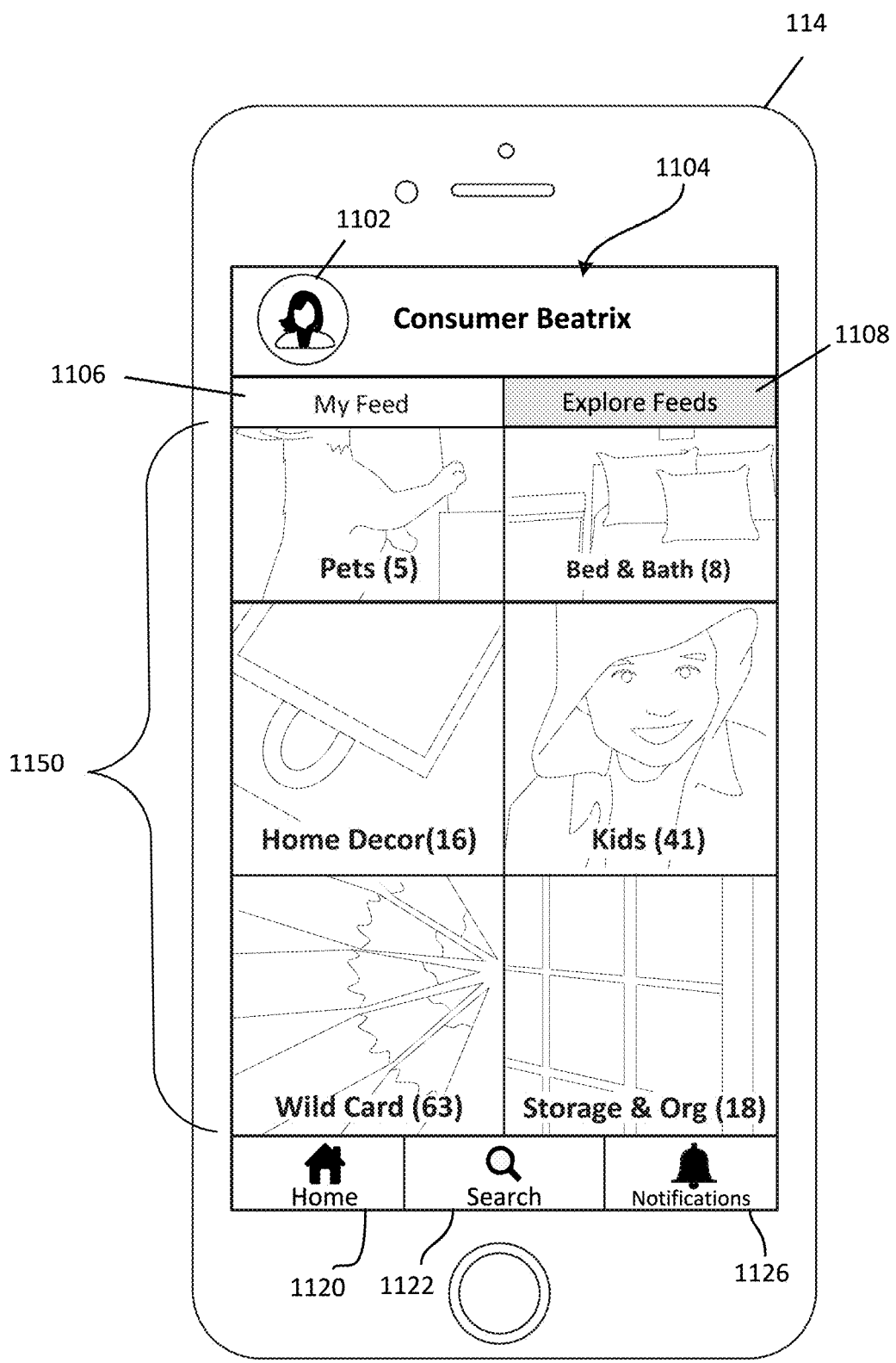
FIG. 13 shows another example of the audience member user interface of FIG. 11.

FIG. 13 depicts another example view of the user interface 1100 for a consumer user. In this example, Consumer Beatrix has selected the "Explore Feeds" tab 1108. The feeds 1150 are displayed on the user interface 1100 for selection by the consumer user. In some embodiments, the feeds are categorized by types of products, such as clothing, pet supplies, and bedding. In other embodiments, the feeds are categorized by the types of consumers that might buy or use the products, such as women, boys aged 3 to 5 years, and dogs. In yet other embodiments, the feeds are categorized by other criteria such as new products, product in development, most popular products, and the like. In the embodiment shown in FIG. 13, the feeds 1150 shown have the categories of "Pets," "Bed & Bath," "Home Décor," "Kids," "Wild Card," and "Storage & Org."

FIG. 14 depicts another example view of the user interface 1100 for consumer users that is shown when the user selects "My Feed" 1106 and is viewing posts on the social media feed. In this example, the post 1160 created by Designer Alice is displayed on the feed being viewed by Consumer Beatrix. The post 1160 indicates that Designer Alice created the post by showing Alice in the profile icon 1164. The text 1162 of the post asks consumer user to buy a dog toy, lists a hyperlink to access a website selling the dog toy, and includes a promotional code to use toward the purchase of the dog toy. The dog toy is shown in the image 1166 of the post 1160. The post 1160 also indicates that there are 14 comments 1168, 29 likes 1170, and 3 dislikes 1172. Consumer Beatrix has selected the comments 1168 to display comments 1178 left as feedback by other consumer users and display a comment box 1174 and media upload button 1176. The comments 1178 show the profile icons indicating who left the comment and the content of the comment.

Figure 15:
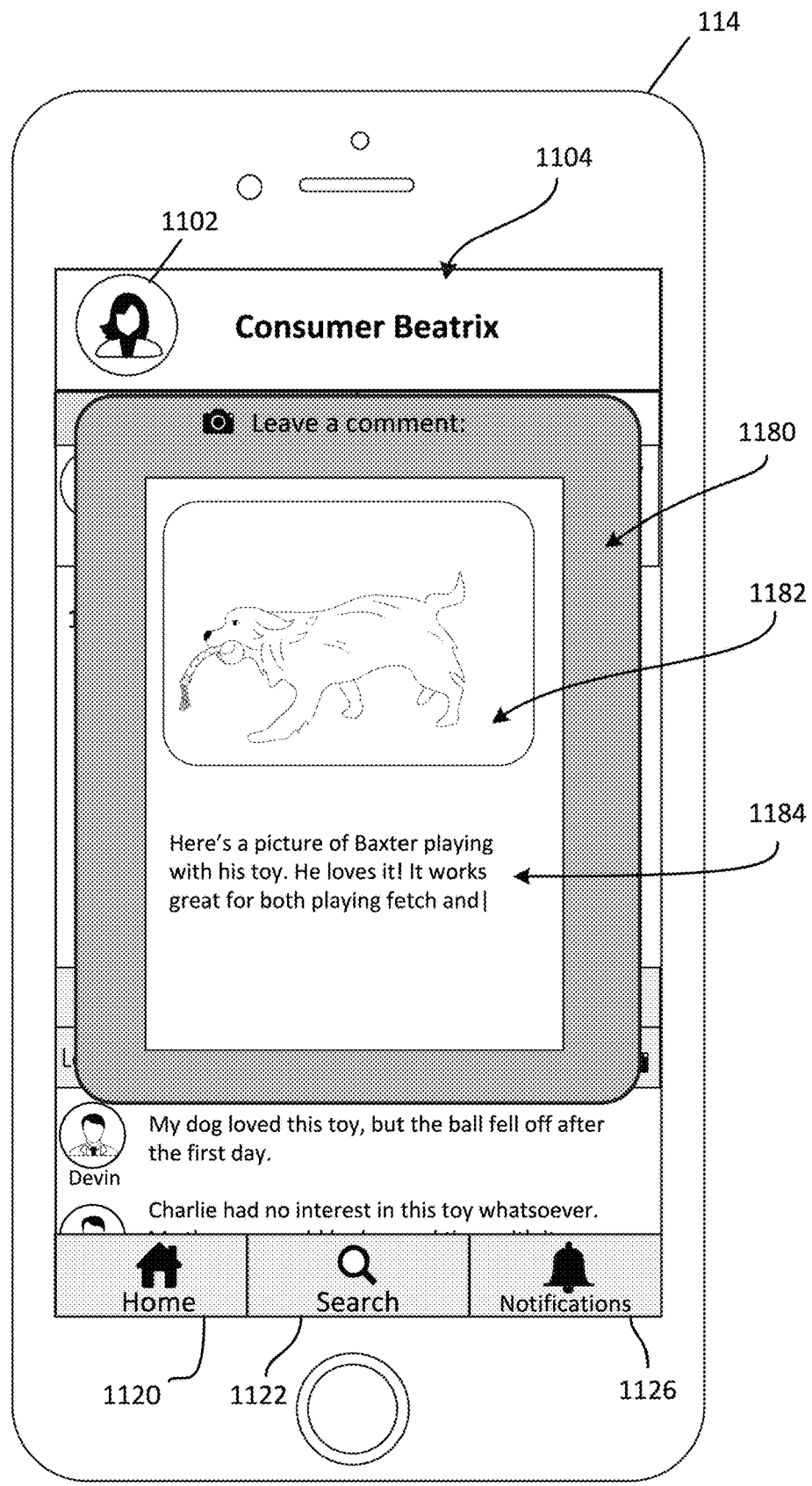
FIG. 15 shows another example of the audience member user interface of FIG. 11.

FIG. 15 shows another example view of the user interface 1100 for consumer users that is shown after the consumer has selected the comment box 1174 to provide text feedback. In this example, Consumer Beatrix has already uploaded an image 1182 of her dog playing with the dog toy, which is displayed in the comment pop-up box 1180. Consumer Beatrix is entering text in the text box 1184.

FIG. 16 show another example view of the designer user interface 600 as viewed by Designer Alice, after Consumer Beatrix has left a comment as feedback to Alice's post about the dog toy. The image 1166 of the dog toy is displayed along with indicators of comments 1168, likes 1170, and dislikes 1172 for the post. The comments 1178 shows that Beatrix left feedback as a comment, as indicated by the profile icon 1602. The comment 1604 left by Beatrix includes the image of her dog that she uploaded along with the text feedback. A more options icon 1606 is displayed next to each comment in the comments 1178 portion of the display. If Designer Alice selects the more options icon 1606, additional options for interacting with the comment 1604 and the consumer user who posted it will be displayed, as described in FIG. 17.

FIG. 17 shows an example view of the designer user interface 600 after the designer user as selected the more options icon 1606. A pop-up box 1610 displays options for interacting with the feedback left on the post. In this example, the pop-up box 1610 displays a profile icon 1602 for the consumer user who left the comment along with identifying information 1612 for the consumer user. In some embodiments, the identifying information 1612 includes the consumer's name (Beatrix), the consumer's location (Houston, Tex.), and the consumer's age (29). Also displayed are buttons providing options to "View Profile" 1614, "Reply to Comment" 1616, "Reward Feedback" 1618, "Share to Public Reviews" 1620, "Pin Comment to Top" 1622, and "Private Message" 1624.

Selecting "View Profile" 1614 will display the user profile of the consumer user that left the comment. In this example, Beatrix's profile would be displayed. Information supplied by Beatrix in creating her profile will be used to populate the display. Beatrix can select in her preferences which information is accessible by the designer users. For example, Beatrix might enter a cell phone number in her profile information, but does not wish for designer users to have access to that information, so Beatrix elects not to share that information.

Selecting "Reply to Comment" 1616 will display a pop-up box allowing the designer user to enter text or other media to post in reply to the comment on the social media feed. This reply will be viewable by all users of the social media feed. In some instances, the consumer user who left the original comment will be notified if a designer user leaves a reply in response to the original comment. In some embodiments, the consumer user will receive extra points for leaving feedback if a designer user leaves a reply.

Selecting "Reward Feedback" 1618 will display a pop-up box displaying options for the designer user to provide a reward to the consumer user for providing valuable feedback to the designer user's post. In this example, Designer Alice may decide that Consumer Beatrix provided valuable feedback by commenting on her post about the dog toy. Designer Alice could award Consumer Beatrix a number of points. Alternatively, Designer Alice could provide a specific reward in the form of a coupon, a promotional code, access to exclusive content, or an invitation to an exclusive event. For example, Designer Alice could send Consumer Beatrix a coupon for dog products. In another example, Designer Alice could send Consumer Beatrix to an exclusive event sponsored by the retailer that sells the dog toy.

Figure 20:
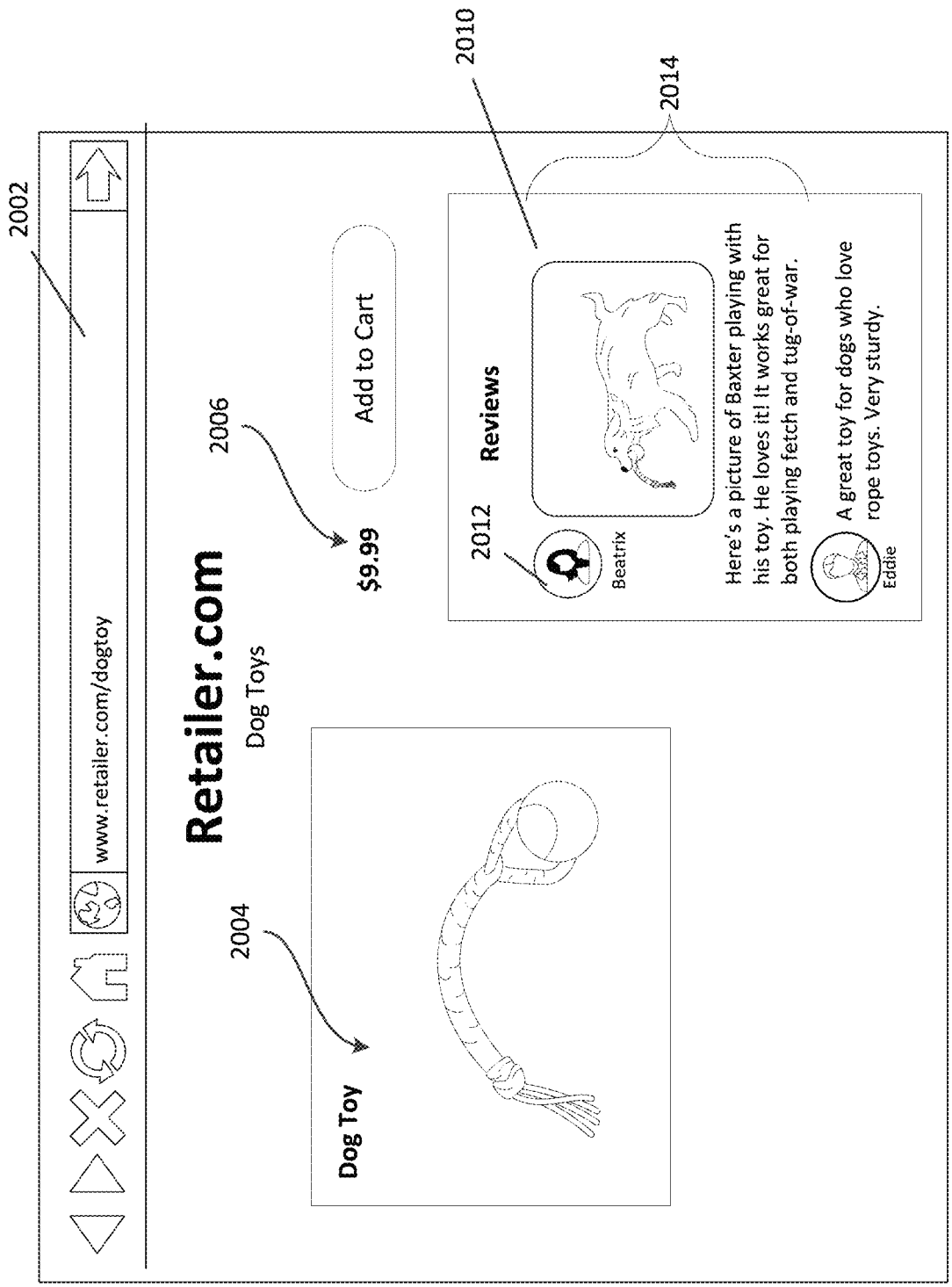
FIG. 20 illustrates an example display of a web browser displaying a public website.
Figure 21:
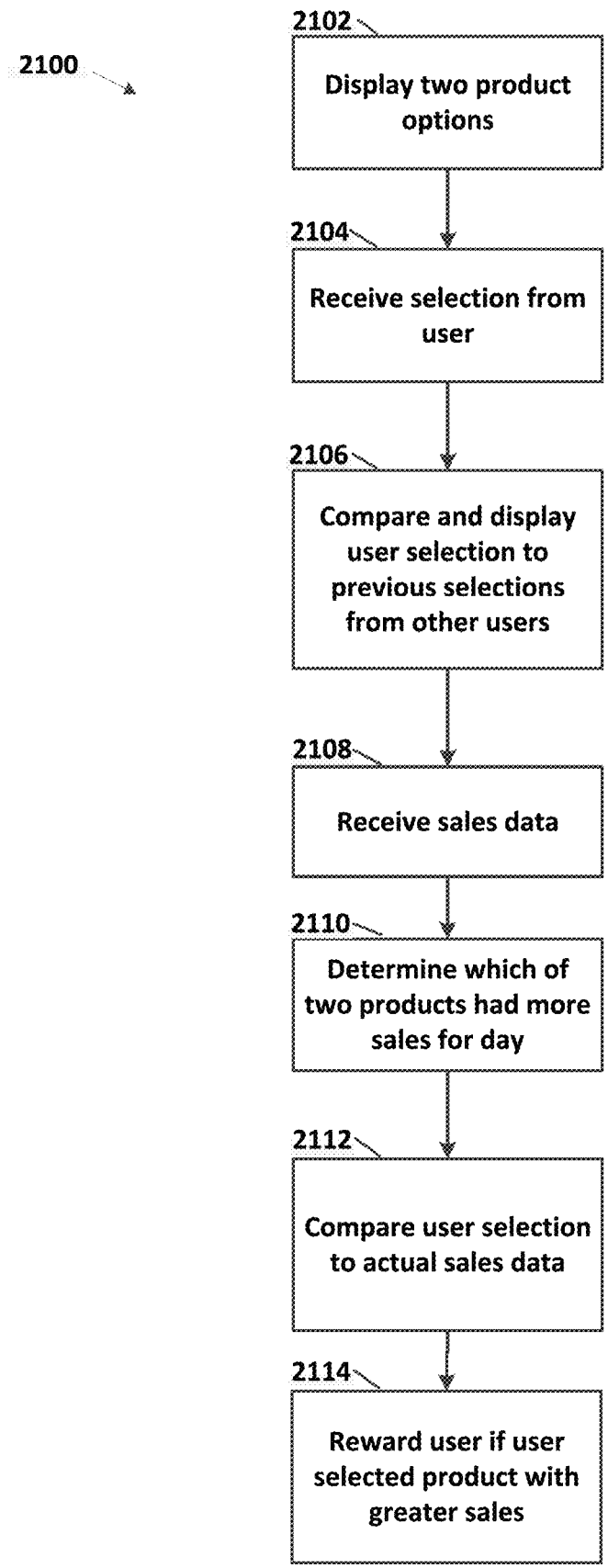
FIG. 21 is a flowchart of an example method of operating a game on the system of FIG. 1.

Selecting "Share to Public Reviews" 1620 will display an option to public the consumer's comment to a public website. In some embodiments, the public website is a website for a retailer that sells the product that is the subject of the post which the consumer has left feedback. An example of this is shown in FIG. 20.

Selecting "Pin Comment to Top" 1622 sends a command to the social media feed to display the consumer user's comment first, regardless of which comment was most recently published. Pinning a comment ensures that the comment is more prominently displayed on the feed. In some embodiments, pinning a commenting to the top of the display will result in the user who left the comment receiving rewards. For example, if Designer Alice pins Consumer Beatrix's comment, Beatrix will receive 5 points in rewards. In some embodiments, comments that are pinned will be automatically communicated to a public website.

Selecting "Private Message" 1624 will display a pop-up box for sending a message to the consumer user. In this example, a message would be sent from Designer Alice to Consumer Beatrix. This allows designers to further communicate with consumers regarding feedback of the product without the conversation being viewed by other designer and consumer users.

FIG. 18 shows an example display of the consumer user interface 1100. In this view, Consumer Beatrix is viewing posts on "My Feed." 1106. At the notifications indicator 1126, a numeral 1802 is displayed indicating the number of new notifications that Consumer Beatrix has received. In this example, Beatrix has received one new notification. Selecting the notifications icon 1126 will display a page on the user interface 1100 listing notifications for the user. In this example, a new notification would be displayed stating that Beatrix has received a new reward from Designer Alice. Consumer Beatrix can select a link that leads to a display of the consumer user's rewards.

FIG. 19 illustrates an example display of the consumer user interface 1100 showing the consumer's rewards page. A notification 1900 stating "Designer Alice sent you a new reward!" is displayed. Also displayed are the number of points 1902 in the user's account as well as a gift card balance 1904 associated with the user's account. Other displays of rewards account information are possible. For instance, the rewards could be displayed as badges, stars, and tokens. Alternatively, the rewards could only be displayed as promotional credit shown in dollar amounts. In some embodiments, an "Exchange" button 1906 is displayed that, when selected, allows the consumer user to exchange points accumulated for more tangible rewards. The tangible rewards may include gift card credit, coupons, free items, and access to exclusive content and events. In some embodiments, a "Redeem" button 1908 is displayed that, when selected, allows the consumer to use a gift card balance to purchase one or more items. In some embodiments, the gift card balance can be used to purchase items from an online retailer's website and selecting the "Redeem" button 1908 opens a web browser or application where the consumer user can shop online for items.

FIG. 20 illustrates an example display of a web browser displaying a public website 2000 for an online retailer. In this example, the web browser has accessed, www.retailer.com/dogtoy, as indicated by the address bar 2002. The public website 2000 indicates that the web page is for retailer.com. The display on the public website 2000 shows an image 2004 of the dog toy product, a price 2006 of the product, as well as an "Add to Cart" button 2010. Also displayed are reviews 2010 for the product. Included in the reviews is a review 2014 from Beatrix, as indicated by the profile icon 2012, which includes identical content to the comment left as feedback by Consumer Beatrix in response to Designer Alice's post, as shown in FIG. 16. Consumer Beatrix's feedback was shared to the public website 2000 by the action of Designer Alice, as described in FIG. 17. In some embodiments, Consumer Beatrix will receive rewards for having a comment posted to a public website, such as 10 points.

Referring to FIGS. 9-20 generally, alternative applications of the user interfaces are also possible. For example, a designer could grant points or monetary credits to specified users to perform an in-store purchase of specific goods. For example, rather than presenting a promotional code in FIG. 9, Designer Alice may ask for a predetermined number of volunteer consumers who are willing to purchase a product to test (e.g., the dog toy product of the example above). In such an example, Consumer Beatrix may receive a credit useable to make an in-store purchase of the dog toy, which is redeemable through the user application by presenting a code (e.g., a QR code) in the application, or by notifying Designer Alice to send a gift card to Consumer Beatrix so that the dog toy can be purchased.

In addition, specific in-person operations can be requested to be performed via the consumer user interface 1100. For example, Designer Alice may request for Consumer Beatrix to view a particular display in-store or a physical version of a particular item prior to providing feedback. Other variations are possible in which in-store or physical viewing of products may be used in place of viewing photographs of such products as well.

Games

In some embodiments, games are incorporated into the social media feeds on the social media-based platform. Games may be included in the social media feeds to entertain and engage consumer users and to encourage consumers to view the feeds on a regular basis. In some embodiments, new games are presented each day to encourage consumer users to view the social media feeds every day. The games also provide an additional source of feedback on products that could prove useful for designers.

In one example of a game, users predict how well products will sell and the results of the game are based on actual sales of the products. An example method 2100 of operating such a game on a social media feed is provided in FIG. 21. In exemplary embodiments, the method 2100 is performed by the gaming engine 226.

Figure 22:
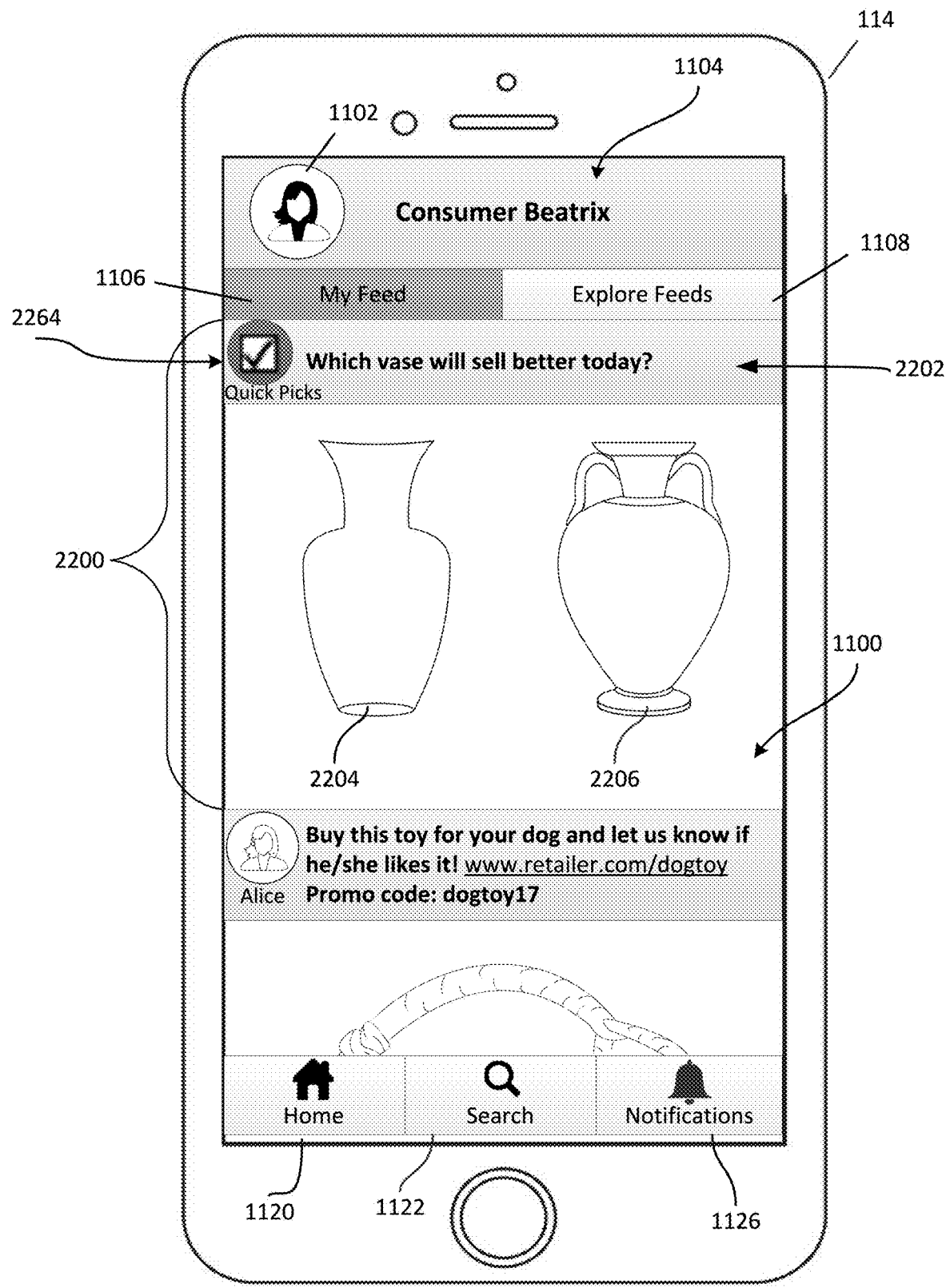
FIG. 22 shows another example of the audience member user interface of FIG. 11 implementing a game.

At operation 2102, two product options are displayed. In some embodiments, the product options are accompanied by text indicating to a user to make a selection. For example, as shown in FIG. 22, the game asks "Which vase will sell better today?" The product options may be displayed with photos of the products. In some embodiments, the photos are accompanied by descriptive titles of the products or a brand name of the product. In some embodiments, the two products are of a similar type and price.

At operation 2104, a selection of a product is received from the user. In some embodiments, the selection is received from touching a touch screen over the image of the product. In other embodiments, the selection is made by selecting a radio button or entering text indicating the user's selection.

Figure 23:
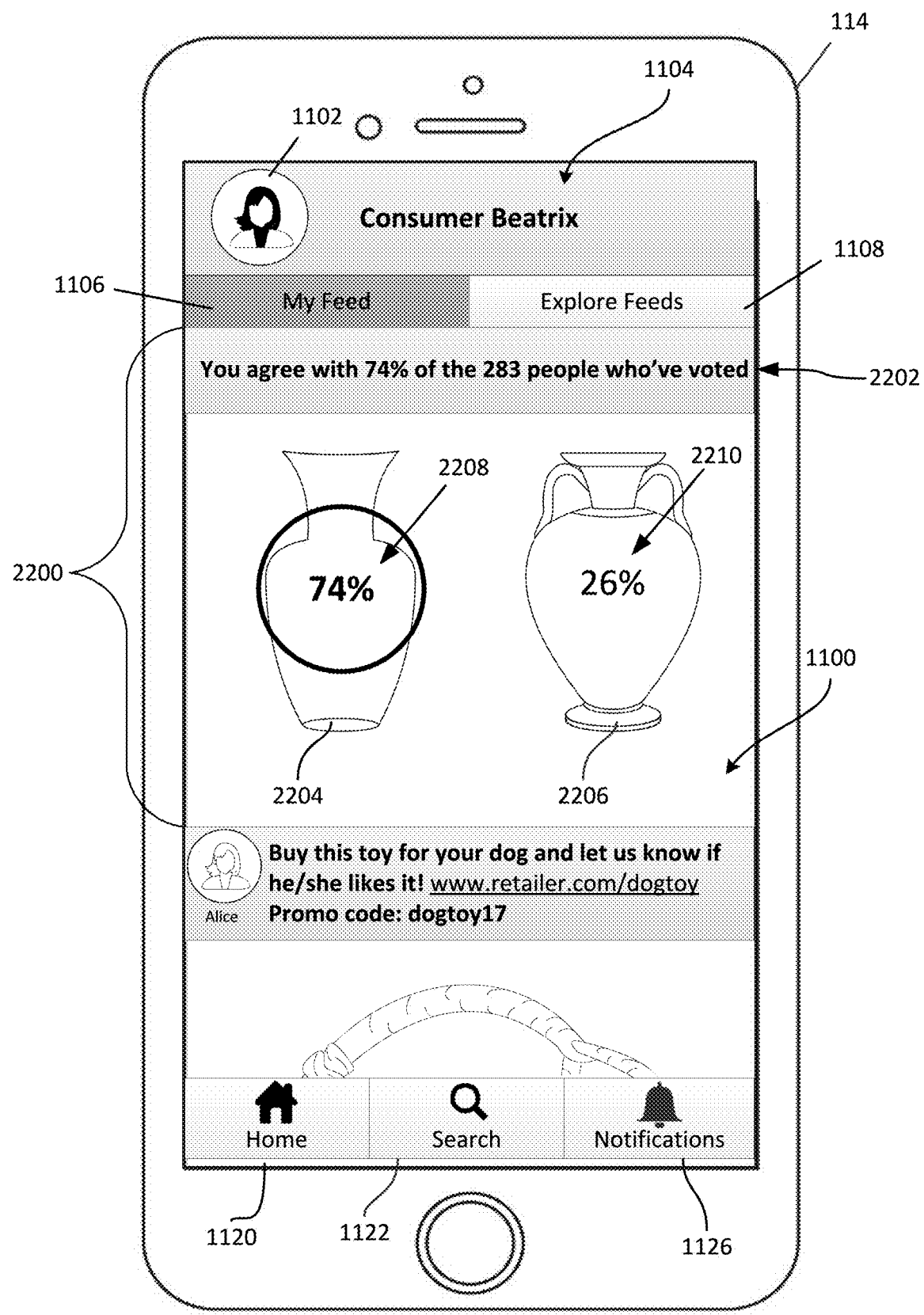
FIG. 23 shows another example of the audience member user interface of FIG. 11 implementing a game.

At operation 2106, the user's selection is compared to that of previous selections from other users. In some embodiments, the user's selection is displayed indicating how the user's selection compares with those of other users. An example of such a display is shown in FIG. 23.

At operation 2108, sales data is received from one or more retailers. In some embodiments, the sales data indicates the sales for the two products for one day. In some embodiments, the game is played to determine the sales for the current day and the sales data is received at the end of the day. In some embodiments, the sales data is accessed from the sales data store 110 by the gaming engine 226.

At operation 2110, it is determined which product had more sales for the day. In one embodiment, the product having greater sales is the product which sold more units than the other product.

At operation 2112, the user's selection is compared to the actual sales data. It is determined if the user selected the product having greater sales for the day.

At operation 2114, the user is rewarded if the user's selected product had greater sales for the day. In some embodiments, the user earns points for correct selections. In some embodiments, if the user accumulates multiple correct selections in a row, the points will be awarded in greater numbers over time. In some embodiments, the points can be exchanged for rewards similar to the rewards described above with respect to FIG. 19.

FIG. 22 illustrates an example display of the consumer user interface 1100 operating on a consumer user computing device 114. In this example, Consumer Beatrix is viewing "My Feed" 1106 which is displaying a game 2200 on the social media feed. The game 2200 is displayed in a similar manner as other posts on the social media feed. A message 2202 poses the question "Which vase will sell better today?" The profile icon 2264 indicates that instead of a designer user providing a post, the game is being provided by a particular game source. In this example, the profile icon 2264 indicates that the game is a "Quick Picks" game. The game 2200 displays two product options for a consumer user to choose from. In the example of FIG. 22, a first vase 2204 and a second vase 2206 are displayed. In some embodiments, the two products displayed have a similar function and price point. To participate in the game, the consumer user makes a selection of the product that he or she thinks will have better sales that day.

After the consumer user's selection is made, the game 2200 presents a different display, as shown in FIG. 23. The message 2202 now informs the consumer that "You agree with 74% of the 283 people who've voted." Additionally, in some embodiments, the game 2200 displays a comparison of how the consumer user voted with the votes of other consumers users. In the example of FIG. 23, the percentage of users who voted for each product is displayed over the images of the products. As shown here, the first voting percentage 2208 reflects that 74% of users voted for the first vase 2204 and the second voting percentage 2210 reflects that 26% of users voted for the second vase 2206. In some embodiments, the game does not display the votes of other users.

Figure 24:
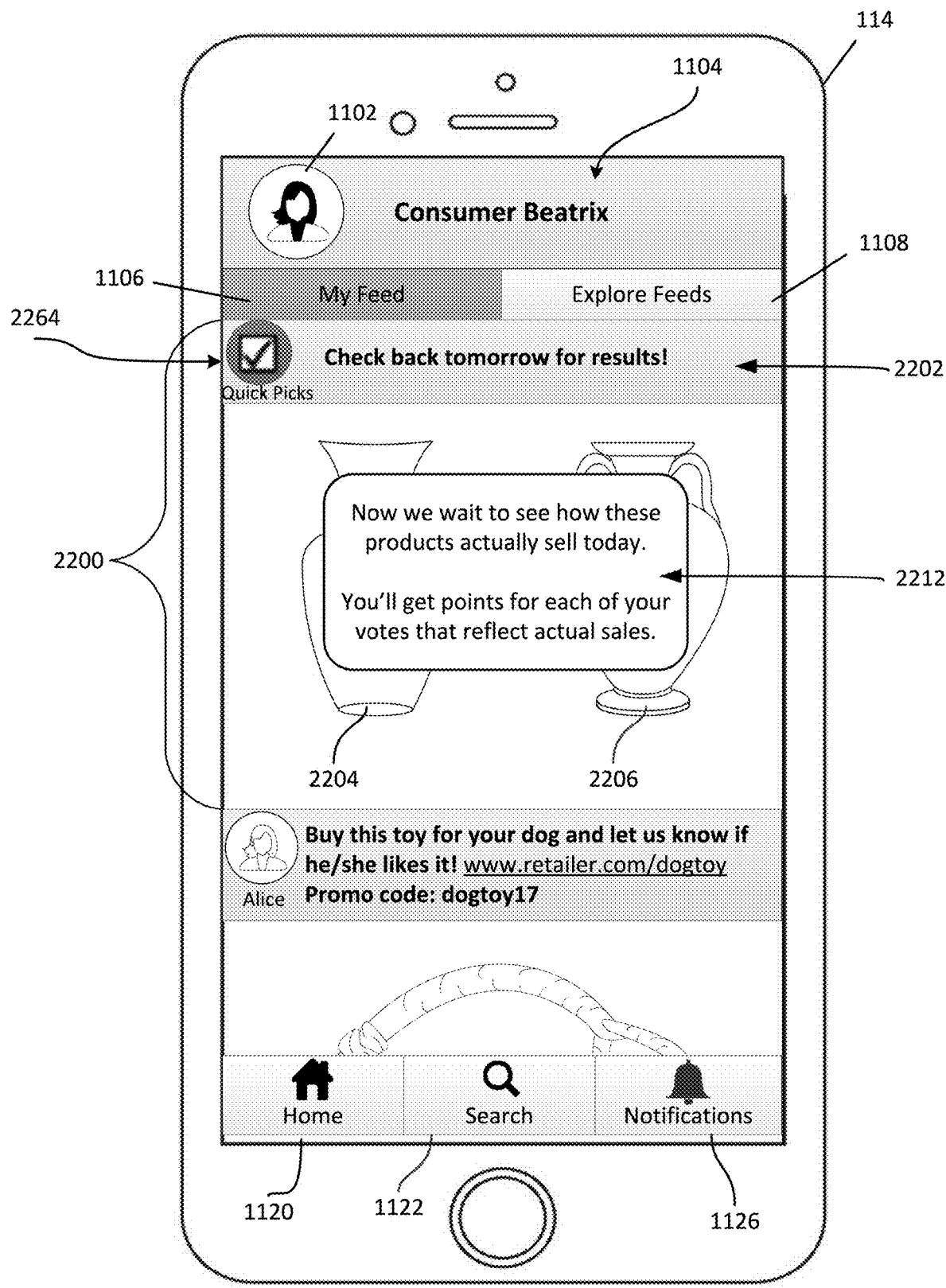
FIG. 24 shows another example of the audience member user interface of FIG. 11 implementing a game.

FIG. 24 shows an example display of the game 2200 after the consumer user has made his or her product selections. In this view, the message 2202 reads "Check back tomorrow for results!" The pop-up message 2212 explains that the game is based on the sales of the current day and that the results will be reported the following day. In this example, the message 2212 reads "Now we wait to see how these products actually sell today. You'll get points for each of your votes that reflect actual sales."

In the example game described in FIGS. 21-24, the consumer users are asked to use their judgement to choose which of a pair of products will have better sales for the day. In some embodiments, the user is presented with multiple pairs to choose from each day. The user must return to the social media feed to view the game the following day to see the results. In some embodiments, consumer users are rewarded for playing the game multiple days in a row. In some embodiments, consumer users are further rewarded for accumulating correct picks over time. In some embodiments, consumer users can compare their performance in the game with that of other users. This comparison can be on the basis on points accumulated over various periods of time such as daily, weekly, monthly, or even yearly time periods.

User Permissions

In some aspects, consumer users are requested to grant permission for the social media-based platform to utilize information and feedback from the consumer user. In order to participate in the closed group and view social media feeds, consumer users must at least opt-in to share some personal information with designer users and to permit designer users to view the consumer user's feedback. In some embodiments, consumers users are requested to grant permission to designer users to communicate with them directly. The goal of the social media-based platform is to encourage two-way communication between designers and consumers, so it is important that consumers grant certain access to designers to facilitate that communication. In some embodiments, consumer users are also requested to grant permissions for third party designers to access and use the consumer's feedback and information.

Figure 25:
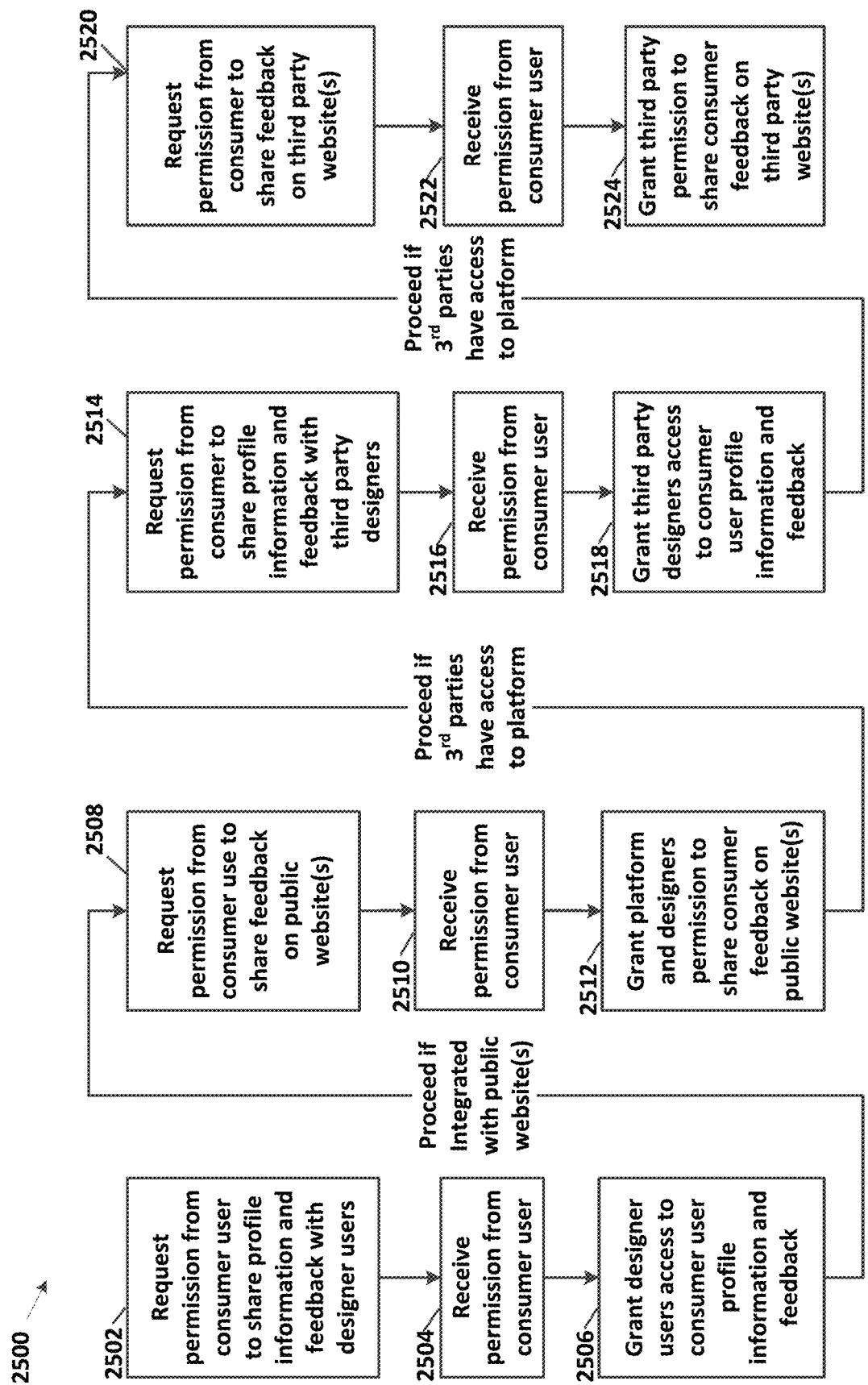
FIG. 25 is a flowchart of an example method of obtaining permissions from audience members implemented on the system of FIG. 1.
Figure 28:
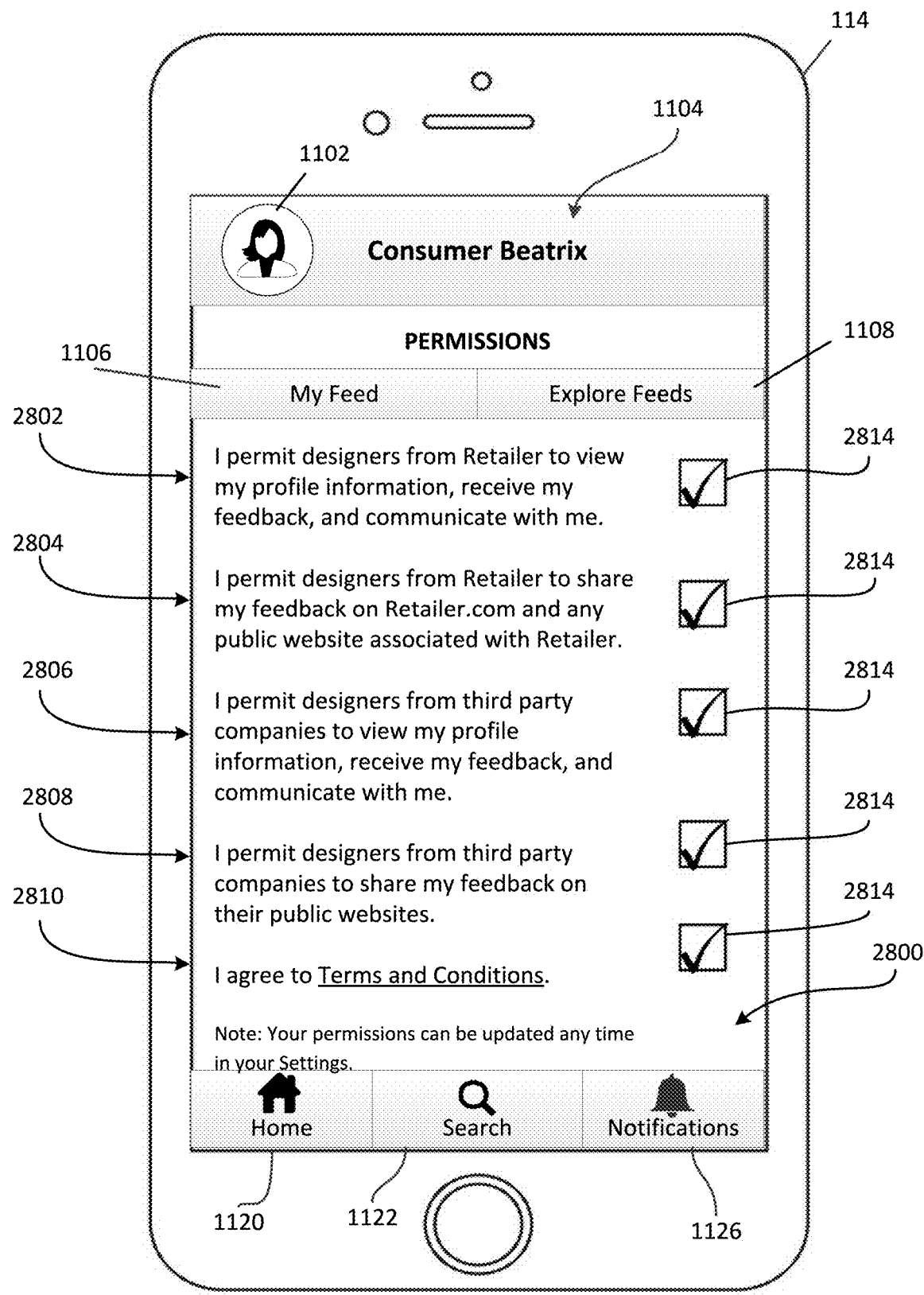
FIG. 28 shows another example of the audience member user interface of FIG. 11 implementing profile setup.

FIG. 25 provides a flowchart of an example method 2500 of managing consumer user permissions. The method 2500 may be implemented by embodiments of the administrative server 104. In some embodiments, the consumer user is prompted to grant permissions upon logging in to the social media-based platform for the first time. For example, as shown in FIG. 28, consumer users may be prompted to grant permissions as part of a profile setup process. In other embodiments, permissions are automatically granted by default as part of a user agreement upon downloading a computing application that implements the social media-based platform on the user's computing device. Levels of permission that are requested or required may vary depending on the features available the social media-based platform.

At operation 2502, permission is requested from the consumer user to share profile information and feedback with designer users. The profile information can include one or more of the user's name, location, age, shopping interests, and the like. In some embodiments, the user's profile information includes links to the user's social media accounts such as Facebook or Pinterest. In some embodiments, the consumer user is prompted to grant permission by a display on the consumer user's computing device. In some embodiments, the consumer user is required to permit access to profile information and feedback in order to participate in the social media-based platform. In the example shown in FIG. 28, the user is requested to provide permissions by checking boxes on a display.

At operation 2504, permission is received from the user to share the user's profile information and feedback with designer users. In some embodiments, the consumer user grants permission by clicking a button, selecting a selector, checking a checkbox, and the like. In other embodiments, the consumer user's permission is granted automatically by using the social media-based platform. In such embodiments, the disclaimer may be displayed to the user indicating that the consumer user is granted access to the social media-based platform in exchange for granting permission for the user's profile information and feedback to be shared with other users.

At operation 2506, designer users within the private community of users are granted access to the consumer user's profile information and feedback submitted by the consumer user. The designer users are then able to view the consumer user's profile information if the designer user selects the consumer user's name or profile icon within the social media feed. The consumer user's feedback will be viewable by the designer users on the feed as well. This permission may be recorded in a data store, such as the permissions 254 data store of the administration server 104.

If the social media-based platform allows for integration with one or more public websites, the method 2500 continues to operation 2508. In some embodiments, the public website allows for sales of products from the same company that the designer users work for. For example, if the designers work for a department store, the website for that department store would be the public website that feedback can be posted to. In some embodiments, feedback is automatically posted to the public website if it has received favorable evaluations from designer users.

At operation 2508, permission is requested from the consumer user to share the consumer user's feedback on one or more public websites. Permission may be requested in a manner similar to those discussed at operation 2502.

At operation 2510, permission is received from the consumer user to share feedback on public websites. Permission may be received from the consumer user in a manner similar to those discussed at operation 2504.

At operation 2512, one or both of the administrator server 104 and the designer users are granted permission to share the consumer user's feedback on public websites associated with the designers' company. This permission may be recorded in a data store, such as the permissions 254 data store of the administration server 104.

If designers from third party companies will have access to the community of consumer users through the social media-based platform, the method 2500 continues to operation 2514. Third parties may be companies that have a relationship with the designer users' company. In some embodiments, the third parties are no associated with the designer users' company, but have similar product offerings. Generally, the third party is interested in obtaining feedback from the consumer users in the community.

At operation 2514, permission is requested from the consumer user to share profile information and feedback with third party designers. In some embodiments, the consumer user is requested to grant the same permissions to third party designers as the consumer user granted to designer users. In some embodiments, the consumer user can customize the level of access that the third party users have to the consumer user's information and feedback. The request can be made in the same manner as described in operation 2502.

At operation 2516, permission is received from the user to share the user's profile information and feedback with third party designers. Permission may be received from the consumer user in a manner similar to those discussed at operation 2504.

At operation 2518, designer users from the third party are granted access to the consumer user's profile information and feedback submitted by the consumer user. The third party designers are then able to view the consumer user's profile information feedback on the feed. This permission may be recorded in a data store, such as the permissions 254 data store of the administration server 104.

Finally, if the third party has the option to share feedback to their website or another public website, the method 2500 proceeds to operation 2520.

At operation 2520, permission is requested from the consumer user to share the consumer user's feedback on third party websites. The request can be made in the same manner as described in operation 2502.

At operation 2522, permission is received from the user to share the consumer user's feedback on the third party websites. Permission may be received from the consumer user in a manner similar to those discussed at operation 2504.

At operation 2524, designer users from the third party are granted permission to share the consumer user's feedback on third party public websites. This permission may be recorded in a data store, such as the permissions 254 data store of the administration server 104.

Various combinations and arrangements of steps are possible for the method 2500 of establishing permissions for consumer user information and feedback. In some embodiments, the consumer user can pick and choose which permissions to grant. In other embodiments, the consumer user may have to grant all permission to participate in the social media-based platform community. One example of how a consumer user can grant permissions is illustrated in FIGS. 26-28 as part of a profile setup process.

Figure 26:
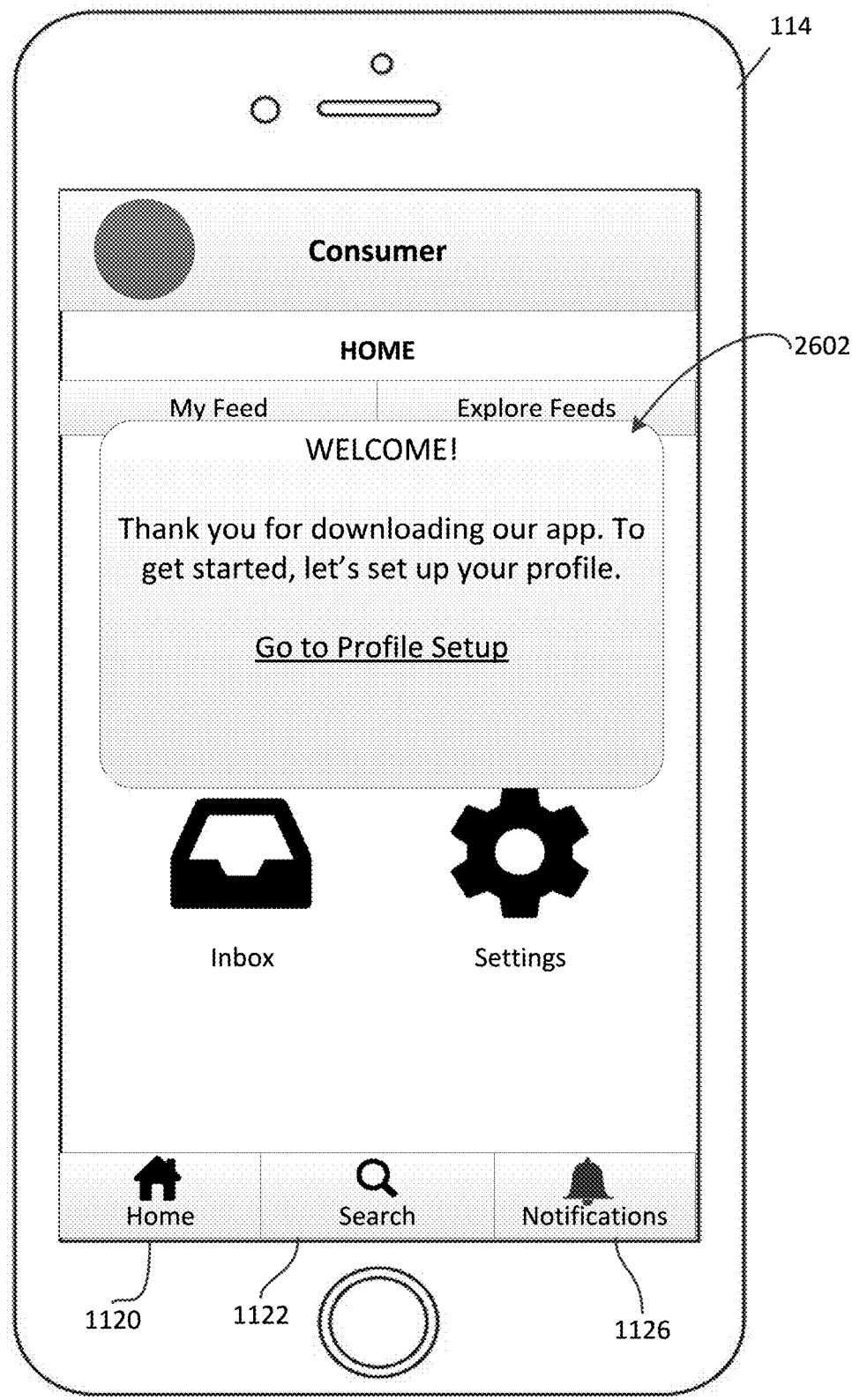
FIG. 26 shows another example of the audience member user interface of FIG. 11 implementing profile setup.

FIG. 26 illustrates an example view of a user interface 2600 for a consumer user that has just accessed the social media-based platform for the first time. The consumer user may have downloaded a computing application from an online store and has initiated operation of the application. The pop-up message 2602 displayed welcomes the new user and prompts the consumer user to establish a profile. The pop-up message 2602 reads "WELCOME! Thank you for downloading our app. To get started, let's set up your profile." A link 2602 to profile setup is also displayed. Selecting the link 2604 results in the display of FIG. 27.

Figure 27:
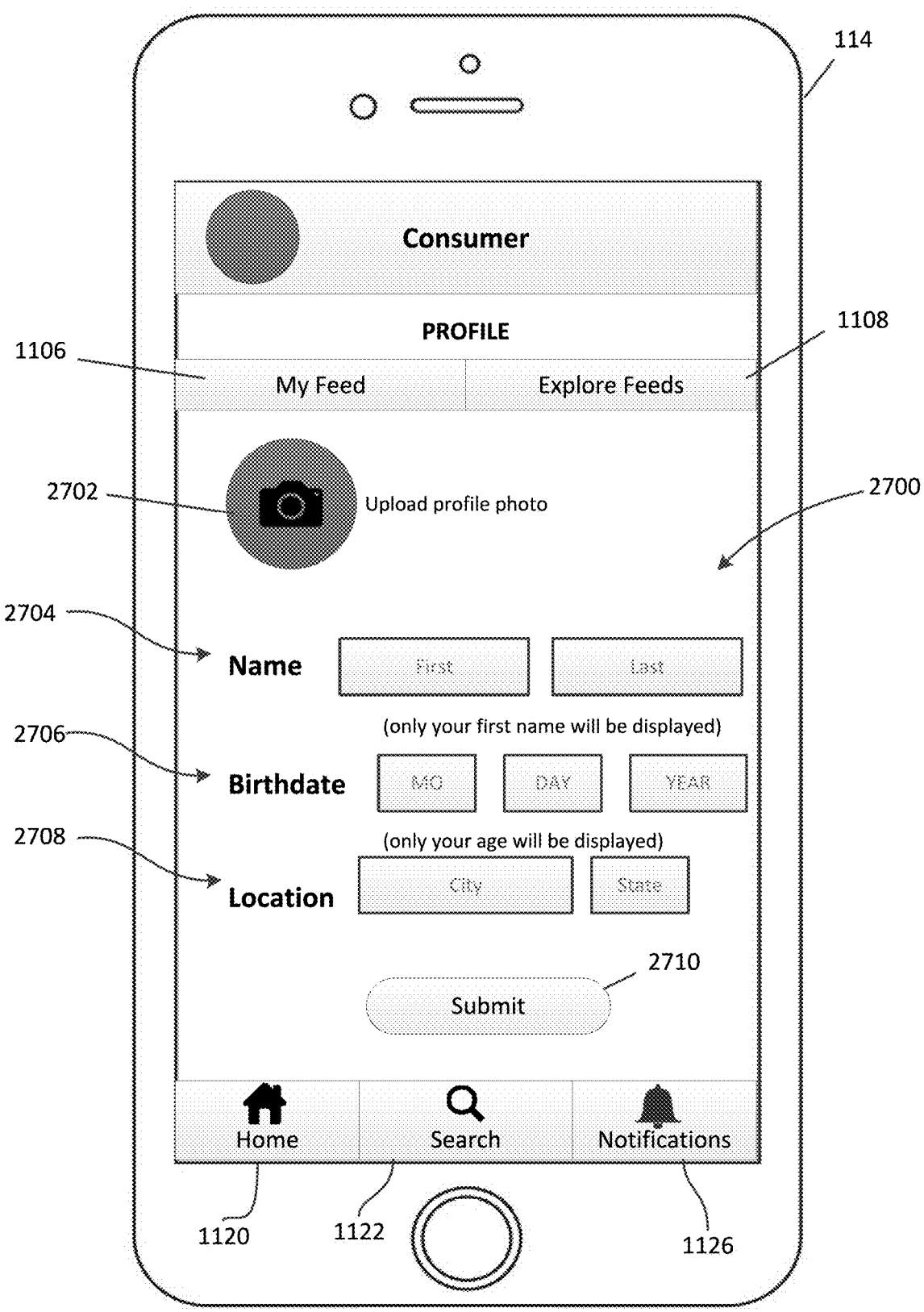
FIG. 27 shows another example of the audience member user interface of FIG. 11 implementing profile setup.

FIG. 27 illustrates an example view of a user interface 2700 for setting up a consumer user profile. In some embodiments, new consumer users are prompted to enter information about themselves. Some or all of that information will be made available to designer users within the social media feeds. A profile photo icon 2702 is displayed that can be selected by the consumer user to upload a profile photo. In some embodiments, the consumer user can upload a photo file from the consumer user's computing device 114. In some embodiments, the consumer user can select a photo to upload from a social media account associated with the consumer user. The user is prompted to enter information by providing blanks or fillable fields. The name field 2704 can be filled by typing in the consumer user's name. There are also fields displayed for birthdate 2706 and location 2708. Other information fields are possible as well. In some embodiments, only some of the entered information will be accessible by designer users. The consumer user's information is stored in the consumer users' accounts 212 on the product feedback server 102. The consumer user can select the submit button 2710 to enter the information into the social media-based platform.

FIG. 28 illustrates an example view of a user interface 2800 for granting permissions. In this example, the consumer may opt to provide some but not all permissions. However, the system can make some permissions mandatory for the consumer user to be granted access to the social media feeds. Shown in FIG. 28 are various permissions that the consumer user may consent to by selecting checkboxes 2814.

At permission 2802, Consumer Beatrix grants designers from "Retailer" permission to view profile information, receive feedback, and communicate with her. In this example, if Beatrix did not grant permission 2802, she would not be granted access to the social media feeds.

At permission 2804, Consumer Beatrix grants designers from Retailer to share her feedback on their public website, Retailer.com, along with associated websites. In this example, permission 2804 is optional. Consumer Beatrix could opt to refuse permission to post her feedback to public website and could still have access to the social media feed. However, in this instance, the checkbox 2814 indicates that she has granted permission 2804.

At permission 2806, Consumer Beatrix permits designers from third party companies to view her profile information, receive her feedback, and communicate with her.

At permission 2808, Consumer Beatrix permits designers from third party companies to share her feedback on their public websites.

In some embodiments, the social media-based platform may require the consumer users also agree to terms and conditions 2810. In this example, the terms and conditions 2810 include a link that would open a pop-up box with the detailed terms and conditions for use of the application. If Consumer Beatrix did not agree to the terms and conditions 2810, she would not be granted access to the social media feeds.

It is noted that once a consumer opts in to sharing feedback using the user interface 2800, the administrator of the system may still control the extent and manner in which posts are presented to that user, in particular by third party designers who are not affiliated with the administrator. It is noted that in some situations, designers may be affiliated with the same entity as the administrator, and therefore the designers will also work to ensure a positive consumer experience. However, if a third party designer wishes to access the consumers, that third party designer may not realize preferences of the consumers, and may send requests to the consumer that are too frequent or otherwise not appropriate for the specific audience. Accordingly, third party designer requests may be queued and approved by the administrator at the administration server 104 of FIG. 1, and either published to an appropriate audience or rejected based on the content of the request.

The systems and methods described herein relate to an exchange between product designers and consumers. Product designers obtain valuable feedback from consumers in a manner that takes less time and monetary investment than previous methods. In exchange, consumer users not only get rewards for their valuable feedback, but also get exclusive access to view up and coming product offerings, sometimes before the products are being sold to the public. Such systems have a number of technical advantages over existing product feedback systems. For example, integration of private feedback with public websites of designer organizations provides simpler publication of positive feedback by product designers. Furthermore, integration of rewards with private feedback systems and public websites allows for simpler distribution of both rewards to consumers and funds for consumers to use as part of purchases associated with product research, which would otherwise require funds distribution from a separate source and outside of the platform as implemented (e.g., as noted above with respect to in-store or in-person product use/reviews).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of soliciting feedback from a curated audience, the method comprising:
   providing a social media-based platform for soliciting feedback in exchange for rewards, the social media-based platform comprising a social media feed for two-way communication between a private, curated audience comprising a closed group of consumers and one or more product designers, wherein the consumers are invited to the closed group by the product designers;
   receiving a post from one of the product designers, the post soliciting feedback from one or more of the consumers regarding one or more products;
   displaying the post from the one of the product designers on the social media feed;
   receiving and displaying feedback from the closed group of consumers regarding the one or more products in response to the post on the social media feed; and
   upon receiving a positive evaluation of one of the consumer's feedback from the product designer, automatically rewarding the consumer for the positive evaluation.

2. The method of claim 1, wherein the private group of consumers is invited to the closed group through a social media interaction with a first retailer.

3. The method of claim 1, wherein the post is a request for one or more of the consumers to purchase the product and provide feedback on the product.

4. The method of claim 3, wherein the feedback is a review of the product.

5. The method of claim 4, wherein the review comprises one or more images and videos of the product.

6. The method of claim 1, wherein the post is an image or video of a product in development combined with text asking a question about the product.

7. The method of claim 1, further comprising regulating the frequency at which posts are published to the social media feed.

8. The method of claim 1, wherein the feedback comprises one or more text comments, likes, votes, images, videos, GIFs, and ratings.

9. The method of claim 1, wherein the positive evaluations are one or more of likes, shares, pins, stars, and ratings.

10. The method of claim 1, wherein rewarding the consumer comprises awarding the consumer one or more of points, tokens, badges, and coins that can be exchanged for one or more of gift cards, coupons, promotional codes, invitations to exclusive events, free products, and access to exclusive content.

11. The method of claim 1, further comprising receiving instructions from a product designer to transfer the feedback from the private social media feed to an external public website, and posting the feedback to the external public web site.

12. The method of claim 11, further comprising requesting permission from the consumer that provided the feedback to post the feedback on the external public web site.

13. The method of claim 1, wherein posts comprise games, the games being designed to increase consumer interaction by providing rewards in exchange for participation.

14. The method of claim 1, further comprising notifying designer users when consumers provide feedback to their posts by sending push notifications to the designer users.

15. The method of claim 1, wherein the post is a poll asking consumers to vote from two or more options regarding one or more features of a product in development.

16. A social media-based product feedback platform comprising:
a product feedback server comprising a processor, a memory communicatively coupled to the processor, and a network access device, the memory storing instructions executable by the processor to:
receive posts from one or more designer computing devices, the posts requesting feedback regarding one or more products in development;
present the posts on a private social media feed accessible by a closed group of one or more consumer computing devices, the consumer computing devices being operated by a curated group of consumer users invited to join the closed group by a designer or administrator;
receive feedback from the one or more consumer computing devices regarding the one or more products in development;
present the feedback to the posts on the social media feed accessible by the one or more designer computing devices;
receive evaluations of the feedback from the designer computing devices; and
present the evaluations on the social media feed.

17. The platform of claim 16, wherein the memory further stores instructions executable by the processor to automatically present rewards to the consumer computing device in response to the evaluations that are positive.

18. The platform of claim 16, further comprising an administration server comprising a processor, a memory communicatively coupled to the processor, and a network access device, the memory storing instructions executable by the processor to:
receive permissions from the consumer computing devices to use feedback on an external public website, and
manage publication of feedback to the external public website based on the permissions.

19. A social media-based product feedback platform comprising:
a product feedback server comprising:
a social media interface engine for presenting posts and feedback on a private social media feed accessible by a closed group of consumer users and designer users, the posts requesting feedback regarding at least one product being developed, wherein the consumer users are invited to the closed group by the designer users based on activity of the consumer users on a public social media platform interacting with an entity associated with the designer users;
a consumer reward engine for communicating rewards to consumer users and accounting for rewards;
a public website integration engine for communicating feedback content from the private social media feed to a publicly accessible website;
a gaming engine for generating games and posting the games on the private social media feed;
an administrative server comprising:
a posting management engine for managing timing and content of posts to the private social media feed;
a licensing engine for managing licenses to third parties;
a permissions engine for managing permissions granted from users regarding content on the private social media feed; and
a public web server for integrating posts and feedback from the private social media feed content with a public website.

20. The social media-based product feedback platform of claim 19, further comprising a plurality of mobile computing devices each comprising a processing unit, a memory, and an input/output unit, the plurality of mobile computing devices providing access to a social media feed presented by the product feedback server and the public website.

\* \* \* \* \*